United States Patent
Wang et al.

(10) Patent No.: US 9,066,232 B2
(45) Date of Patent: Jun. 23, 2015

(54) FEMTOCELL ACCESS CONTROL

(75) Inventors: Jun Wang, La Jolla, CA (US); Anand Palanigounder, San Diego, CA (US); Peerapol Tinnakornsrisuphap, San Diego, CA (US); George Cherian, San Diego, CA (US); Chandrasekhar Therazhandur Sundarraman, San Diego, CA (US); Yinian Mao, San Diego, CA (US); Peter Hans Rauber, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 474 days.

(21) Appl. No.: 12/795,412

(22) Filed: Jun. 7, 2010

(65) Prior Publication Data
US 2011/0134837 A1 Jun. 9, 2011

Related U.S. Application Data

(60) Provisional application No. 61/185,139, filed on Jun. 8, 2009.

(51) Int. Cl.
*H04W 84/04* (2009.01)
*H04W 12/08* (2009.01)
*H04L 29/06* (2006.01)

(52) U.S. Cl.
CPC ........... *H04W 12/08* (2013.01); *H04L 63/0892* (2013.01); *H04L 63/101* (2013.01); *H04W 84/045* (2013.01)

(58) Field of Classification Search
CPC ............ H04L 29/12245; H04L 61/203; H04L 63/0892; H04L 29/06829; H04L 63/101; H04W 84/045

USPC ............ 370/310.2, 328–339, 349; 455/422.1
See application file for complete search history.

(56) References Cited

U.S. PATENT DOCUMENTS

2006/0002351 A1* 1/2006 Madour ......................... 370/338
2006/0223498 A1* 10/2006 Gallagher et al. ............ 455/410

(Continued)

FOREIGN PATENT DOCUMENTS

JP    2009510969 A    3/2009
JP    2010541475 A    12/2010

(Continued)

OTHER PUBLICATIONS

3rd Generation Partnership Project, Technical Specification Group Service and System Aspects, Security of H(e)NB,(Release 8), 3GPP Draft, 33820-800, 3rd Generation Partnership Project (3GPP), Mobile Competence Centre, 650, Route Des Lucioles, F-06921 Sophia-Antipolis Ceder, France, no. Sophia, Mar. 16, 2009, XP050347172, [retrieved on Mar. 16, 2009].

(Continued)

*Primary Examiner* — Hoon J Chung
(74) *Attorney, Agent, or Firm* — Fariba Yadegar-Bandari

(57) ABSTRACT

Access by a mobile station to a femto access point (FAP) of a wireless communication system is controlled by an enforcement point in response to mobile station authorization data provided from a storage point that is remote from the FAP. The authorization data is provided in response to FAP authentication data. The authentication data may include a FAP identifier and a message authenticator that the FAP generates by hashing shared secret information. The storage point may provide the authorization data in response to determining that the message authenticator is a hash of the shared secret information.

30 Claims, 13 Drawing Sheets

(56) References Cited

U.S. PATENT DOCUMENTS

| | | | |
|---|---|---|---|
| 2007/0054668 A1 | 3/2007 | Scheinert et al. | |
| 2007/0223410 A1 | 9/2007 | Oyama et al. | |
| 2008/0040606 A1* | 2/2008 | Narayanan et al. | 713/169 |
| 2008/0076386 A1 | 3/2008 | Khetawat et al. | |
| 2008/0112363 A1* | 5/2008 | Rahman et al. | 370/331 |
| 2009/0006116 A1* | 1/2009 | Baker et al. | 705/1 |
| 2009/0286512 A1* | 11/2009 | Huber et al. | 455/411 |
| 2010/0040019 A1* | 2/2010 | Tinnakornsrisuphap et al. | 370/331 |
| 2010/0074187 A1* | 3/2010 | Sun et al. | 370/329 |
| 2010/0130171 A1* | 5/2010 | Palanigounder et al. | 455/411 |

FOREIGN PATENT DOCUMENTS

| | | |
|---|---|---|
| WO | 2007040449 A1 | 4/2007 |
| WO | WO2009045335 A2 | 4/2009 |

OTHER PUBLICATIONS

International Search Report and Written Opinion—PCT/US2010/037833, International Search Authority—European Patent Office—Mar. 29, 2011.

Taiwan Search Report—TW099118584—TIPO—Feb. 21, 2013.

Huawei, et al., "Revision of Editors notes and NOTEs to H(e)NB TR", S3-090032, 3GPP TSG SA WG3 S3#54, Jan. 12, 2009, pp. 1-26.

Zte: "Method for Discovery and Registration at 3G HNB-GW", 3GPP TSG-RAN WG3#61, R3-082239, Aug. 25, 2008, pp. 1-4.

* cited by examiner

FEMTOCELL ACCESS CONTROL

CROSS-REFERENCE TO RELATED APPLICATION

This application claims priority pursuant to 35 U.S.C. §119(e) to U.S. provisional application Ser. No. 61/185,139, filed Jun. 8, 2009, which application is specifically incorporated herein, in its entirety, by reference.

BACKGROUND

I. Field

The following description relates generally to wireless communications systems, and more particularly to controlling access by mobile stations to femtocell access points of a wireless communications network.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including Evolved UTRA (E-UTRA), and orthogonal frequency division multiple access (OFDMA) systems. Each of the foregoing systems operates over licensed frequency spectrums, and licensee operators generally provide access to users according to a subscription model. The technology described herein pertains to these and similar systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-ary Phase-Shift Keying (M-PSK) or Multi-Level Quadrature Amplitude Modulation (M-QAM)) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals such as mobile stations that communicate with one or more base stations via transmissions on forward and reverse links. The forward link (or downlink) refers to the communication link from the base stations to the mobile stations, and the reverse link (or uplink) refers to the communication link from the mobile stations to the base stations. This communication link may be established via a single-in-single-out, multiple-in-signal-out or a multiple-in-multiple-out (MIMO) system.

A MIMO system employs multiple ($N_T$) transmit antennas and multiple (NR) receive antennas for data transmission. A MIMO channel formed by the $N_T$ transmit and $N_R$ receive antennas may be decomposed into $N_S$ independent channels, which are also referred to as spatial channels. Generally, each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports Time Division Duplex (TDD) and Frequency Division Duplex (FDD) systems. In a TDD system, the forward and reverse link transmissions are on the same frequency region so that the reciprocity principle allows estimation of the forward link channel from the reverse link channel. This enables an access point to transmit beam-forming gain on the forward link when multiple antennas are available at the access point.

In addition, a new class of small base stations for providing access to wireless communication systems has emerged, which may be installed in a user's home and provide indoor wireless coverage to mobile units using existing broadband Internet connections. Such a base station is generally known as a femtocell access point (FAP), but may also be referred to as Home Node B (HNB) unit, Home evolved Node B unit (HeNB), femto cell, femto Base Station (fBS), base station, or base station transceiver system. Typically, the femto access point is coupled to the Internet and the mobile operator's network via a Digital Subscriber Line (DSL), cable internet access, T1/T3, or the like, and offers typical base station functionality, such as Base Transceiver Station (BTS) technology, radio network controller, and gateway support node services. This allows a Mobile Station (MS), also referred to as a cellular/mobile device or handset, Access Terminal (AT) or User Equipment (UE), to communicate with the femtocell access point and utilize the wireless service.

Certain Wireless Access Points (WAP) for access to the Internet or similar wide area networks, for example, Wi-Fi access points under IEEE 802.11, sometimes control access by client devices using encryption schemes such as WEP, WPA or WPA2. Access to the WAP is provided to any device transmitting the key. However, key-based systems may have undesirable aspects for controlling access to a FAP for certain wireless communications systems. For example, a key-based system may not be desirable for some wireless communications systems operating on licensed bandwidth under a subscription model, because among other things access to the FAP can be controlled by any entity, for example a user, possessing the key. Therefore, new access control methods and apparatus are desirable for controlling access by mobile stations to femtocell access points.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

In accordance with one or more embodiments and corresponding disclosure thereof, various aspects are described in connection with methods for femtocell access control. The methods may be performed in a wireless communication network comprising at least one Femto Access Point (FAP) configured for wireless communication with at least one authorized Mobile Station (MS) accessing the network via the FAP. The wireless communication network may be any one of the group consisting of a Session Initiation Protocol (SIP) based circuit-switched network, an Interoperability Specification (IOS) based circuit-switched network, and a packet-switched network The methods may include transmitting FAP authentication data from the FAP to obtain MS access authorization data, for example, an Access Control List (ACL) stored by a remote storage point in communication with the FAP. Advantageously, the ACL is not stored in a non-volatile memory of the FAP or is otherwise not retained in a FAP memory when the FAP is powered off or reset. An access control list may comprise identifiers for authorized mobile stations. The authorization data may further include a FAP type identifier. The methods may further include receiving the authorization data for the FAP from the storage point at an Enforcement Point (EP), in response to the FAP authentication data, and controlling wireless network access by the MS via the FAP at the EP, in response to the authorization data. The methods may further include generating the authorization data in response to determining that the FAP authentication data is valid.

The functions of the storage point in the methods may be performed by any one of the group consisting of an Access Network (AN)-Authentication, Authorization and Accounting (AAA), a femto AAA, a femto Home AAA (HAAA), and a Femto Management System (FMS) server. In some embodiments, the storage point may exclude the FMS.

The functions of the enforcement point in the methods may be performed by the FAP, but in some embodiments, may be performed by a network component that excludes the FAP. More particularly, where the wireless communication network is a circuit-switched network, the functions of the EP may be performed by any one of the group consisting of a Femto Convergence Server (FCS), a Femto Gateway (FGW), and a separate enforcement point. In the alternative, where the wireless communication network is a packet-switched network, the functions of the EP may be performed by any one of the group consisting of, a Packet Data Serving Node (PDSN), a Femto Gateway (FGW), and a separate enforcement point. In further alternative, where the wireless communication network is an Interoperability Specification (IOS) based circuit-switched network, the functions of the EP may be performed by any one of the group consisting of a Mobile Switching Center (MSC), a FGW, and a separate enforcement point.

In another aspect, a communications apparatus is provided. That apparatus includes a memory that retains instructions for transmitting FAP authentication data from the FAP to obtain MS access authorization data; for receiving the authorization data for the FAP from the storage point at an EP, in response to the FAP authentication data, wherein the EP excludes the FAP; for controlling wireless network access by the MS via the FAP at the EP, in response to the authorization data; and a processor that executes the instructions. The instruction may further provide for generating the authorization data in response to determining that the FAP authentication data is valid. The instructions may provide that the ACL is not stored in a non-volatile memory of the FAP or is not retained in a FAP memory when the FAP is powered off or reset.

In another aspect, a computer program product is provided. This includes a computer-readable medium with encoded instructions comprising: code for causing at least one computer to (a) transmit FAP authentication data from the FAP to obtain MS access authorization data; (b) to receive the authorization data for the FAP from the storage point at an enforcement point (EP), in response to the FAP authentication data, wherein the EP excludes the FAP; and (c) to control wireless network access by the MS via the FAP at the EP, in response to the authorization data. The encoded instructions may further comprise code for causing the at least one computer to generate the authorization data in response to determining that the FAP authentication data is valid. The encoded instructions may further comprise code for causing the at least one computer to not store authorization data in a non-volatile memory of the FAP or to ensure that the authorization data is not retained in a FAP memory when the FAP is powered off or reset.

In another aspect, the methods comprise computing a request authenticator at a FAP in a wireless communication network, using first shared information obtained during a prior authentication session with an entity in the wireless communication network. The first shared information may comprises first secret information obtained from a remote AAA entity, femtocell Security Gateway (SeGW), or other network component. In the alternative, the first shared information comprises an IP address assigned by the wireless communication network to the FAP during the prior authentication session with the SeGW or other network component. The methods further comprise transmitting a request message from the FAP to the AAA, the request message comprising a FAP identifier and the request authenticator, thereby enabling the AAA to determine whether the FAP identifier is valid for the FAP. The methods may further comprise determining whether the FAP identifier is valid for the FAP, by independently computing a check value for the request authenticator at the AAA using the first secret information.

The methods may further provide that the FAP receives a response to the request message generated by the AAA in response to determining that the FAP identifier is valid for the FAP. This response may comprise a FAP type identifier and an access control list for the FAP. In these methods, the FAP may control access by mobile stations to the FAP, using the FAP type identifier and the access control list. In the alternative, or in addition, another network component, for example, the AAA, FGW or PDSN may control access to network services via the FAP, using the access control list and a MS identifier.

The methods may further comprise computing a message authenticator at the FAP using second secret information shared with a SeGW for the FAP, and including the message authenticator in the request message. A femto gateway device interposed between the AAA and the SeGW may forward the request message from the FAP to the AAA, in response to determining that the message authenticator is valid. The FGW may check validity of the message authenticator by independently computing a comparison value using the second secret information.

Furthermore, the methods may further comprise that the AAA transmits a response to the request message in response to determining that the FAP identifier is valid for the FAP, the response comprising the message authenticator and an access control list for the FAP. The SeGW may forward the response from the AAA to the FAP, in response to determining that the message authenticator is valid. The FAP may control access by mobile stations to the FAP, using the access control list from the response. In the alternative, or in addition, another network component, for example, the AAA, FGW or PDSN may control access to network services via the FAP, using the access control list and a MS identifier.

The methods may further comprise directing the first secret information to the FAP as determined by a map relating the FAP identifier to a computer network address for the FAP, prior to computing the request authenticator. In methods that include computing a message authenticator at the FAP using second secret information shared with a SeGW, the SeGW and/or AAA may direct the first secret information and the second secret information to the FAP as determined by a map relating the FAP identifier to a computer network address for the FAP, prior to computing the request authenticator. Similarly, in methods wherein the shared information is a FAP IP address from a prior authentication session, the validity of the FEID and IP address can be verified using this map.

A communications apparatus for performing the methods may comprise a memory that retains instructions for computing a request authenticator at a femto access point (FAP) in a wireless communication network, using first shared information obtained during a prior authentication session with an entity in the wireless communication network. The first shared information may comprises first secret information obtained from a remote AAA server, femtocell SeGW or other network component. In the alternative, the first shared information comprises an IP address assigned by the wireless communication network to the FAP during the prior authentication session with the SeGW or other network component. The memory may retain further instructions for transmitting a request message from the FAP to the AAA, the request message comprising a FAP identifier and the request authenticator, thereby enabling the AAA to determine whether the FAP identifier is valid for the FAP. The memory may retain further instructions for determining whether the FAP identifier is valid for the FAP, by independently computing a check value for the request authenticator at the AAA using the first secret information; and instructions for other steps of the methods described above. The apparatus may further comprise a processor configured for wireless communication executing the instructions, and a transceiver for wireless communications coupled to the processor.

A computer program product may likewise be provided, comprising a computer-readable medium with encoded instructions comprising: code for causing at least one computer to (a) compute a request authenticator at a FAP in a wireless communication network, using first shared information obtained during a prior authentication session with an entity in the wireless communication network; and (b) transmit a request message from the FAP to the AAA, the request message comprising a FAP identifier and the request authenticator, thereby enabling the AAA to determine whether the FAP identifier is valid for the FAP. The encoded instructions may further comprise code for causing a computer to determine whether the FAP identifier is valid for the FAP, by independently computing a check value for the request authenticator at the AAA using the first shared information; and encoded instructions for causing a computer to perform other steps of the methods described above.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Throughout the drawings and accompanying description, like reference characters identify correspondingly like elements.

DETAILED DESCRIPTION

Figure 1:
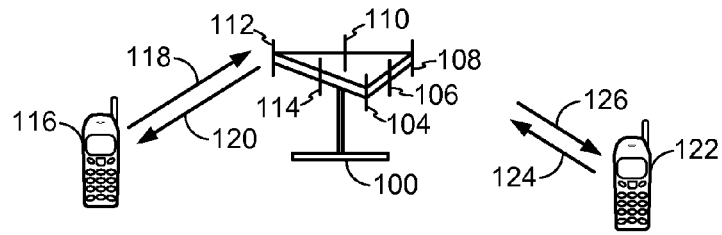
FIG. 1 illustrates a multiple access wireless communication system including a mobile station and a base station.

For the purposes of the present document and the accompanying figures, the following abbreviations apply:
3GPP2 $3^{rd}$ Generation Partnership Project 2
AAA Authentication, Authorization and Accounting
AC Authentication Center
ACL Access Control List
ACS Auto-Configuration Server
AKA Authentication and Key Agreement
AN Access Network
ARQ Automatic Repeat Request
BCCH Broadcast Control Channel
BCH Broadcast Channel
BS Base Station
BSC Base Station Controller
C- Control-
CCCH Common Control Channel
CCH Control Channel
CCTrCH Coded Composite Transport Channel
CP Cyclic Prefix
CPE Customer Premises Equipment
CRC Cyclic Redundancy Check
CTCH Common Traffic Channel
CWMP CPE WAN Mobility Protocol
DCCH Dedicated Control Channel
DCH Dedicated Channel
DL DownLink
DL-SCH Downlink Shared Channel
DSCH Downlink Shared Channel
DSL Digital Subscriber Line
DTCH Dedicated Traffic Channel
FA Foreign Agent FACH Forward link Access Channel
FAP Femtocell Access Point
FCS Femtocell Convergence Server
FDD Frequency Division Duplex
FMS Femtocell Management System
HA Home Agent
HAAA Home AAA
HLR Home Location Register
HRPD High Rate Packet Data
IKE Internet Key Exchange
IMS IP Multimedia Subsystem
IP Internet Protocol
IPsec IP Security
ISC IP Multimedia Service Control
L1 Layer 1 (physical layer)
L2 Layer 2 (data link layer)
L3 Layer 3 (network layer)
LAC Link Access Control
LIPA Local IP Access
LMA Local Mobility Anchor
LMSD Legacy MS Domain
MAC Media Access Control
MAG Mobile Access Gateway
MAP Mobile Application Port
MC Message Center
MGCF Media Gateway Control Function
MGW Media Gateway
MIP Mobile IP
MS Mobile Station
MSC Mobile Switching Center
PCCH Paging Control Channel
PCH Paging Channel
PCF Packet Control Function
PCRF Policy and Charging Rules Function
PDCCH Physical Downlink Control Channel
PDSCH Physical Downlink Shared Channel
PDSN Packet Data Service Node
PDST Packet Data Service Termination
PDU Protocol Data Unit
PHY Physical layer
PhyCH Physical Channels
PMIP Proxy Mobile IP
PPP Point-to-Point Protocol
PSAP Public Safety Answering Point
QoS Quality of Service
RACH Random Access Channel
RIPA Remote IP Access
RLC Radio Link Control
RPC Remote Procedure Call
RRC Radio Resource Control
RTP Real-Time Transport Protocol
SAP Service Access Point
SDU Service Data Unit
SeGW Security Gateway
SHCCH Shared Channel Control Channel
SIP Session Initiation Protocol
SMS Short Message Service
SN Sequence Number
SUFI Super Field
TCH Traffic Channel
TCP Transmission Control Protocol
TDD Time Division Duplex
TFI Transport Format Indicator
TM Transparent Mode
TMD Transparent Mode Data
TTI Transmission Time Interval
U- User-
UA User Agent
UDP User Datagram Protocol
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
VoIP Voice over IP
VSP Vendor-Specific Protocol
WAN Wide Area Network Systems, apparatus and methods are provided to enable femto access point (FAP) access control and FAP authentication. As used herein, access control refers to preventing mobile stations that are not listed on an access control list (ACL) for a particular FAP to access wireless communication services through that FAP, while enabling mobile stations that are identified in the FAP's ACL to access wireless communication services through the FAP. The group of mobile stations identified on a FAP's ACL may sometimes be referred to as a closed subscriber group (CSG) for the FAP.

In some common circumstances, it may be advantageous to provide control at the network level over which mobile stations are identified in the ACL for a FAP. Conversely, it may be advantageous to not permit exclusive control, or in the alternative to not permit any control, by a local agent over the ACL for a FAP that the local agent may be installing or operating. For example, a consumer may purchase or license a FAP for home installation, and it may be desirable to provide service access for the consumer's network-authorized mobile stations via the FAP, without permitting the consumer to enable access for additional mobile stations without the knowledge and consent of the network operator.

In addition, FAP access control may include controlling access to wireless communication services via a FAP in response to a defined FAP type assigned to the FAP. For example, in 3GPP2, at least three types of associations (FAP types) are defined: (1) Open Association, characterized by permitting any mobile station to register with the FAP and access wireless communication services via the FAP, so long as the mobile station is authenticated by the wireless network; (2) Restricted Association, characterized by restricting access to services via a FAP exclusively to mobile stations identified in the FAP's ACL, with unlisted mobiles stations not permitted any access to services via the FAP; and (3) Signaling Association, characterized by permitting any mobile station to register with a particular FAP, but redirecting mobile stations that are not in the FAP's ACL to an accessible macro base station while permitting mobile stations listed on the ACL to access services via the FAP.

Advantageously, the foregoing objectives should be accomplished within design guidelines for minimizing costs and disruptions to existing network infrastructure, while ensuring effective security. For example, implementations should be backward compatible with existing mobile stations, as well as new devices. It may also be desirable to minimize changes to existing designs to 1× circuit switched (CS) and to High Rate Packet Data (HRPD) or 1× packet switched (PS) system designs. For further example, there should be minimal or no changes to existing network elements such as Authentication, Authorization & Accounting (AAA) servers, packet data serving nodes, mobile switching centers, and so forth. Enforcement of control methodologies should be by trusted, secure entities within the network. Requirements for new or modified interfaces should be minimal Access control data should be stored at a single storage point for both 1× CS and PS systems. The control methodology should not be limited to femtocell access points, but should also be capable of being applied to macro base stations. The foregoing exemplary guidelines may be helpful in designing useful embodiments, but do not limit the technology described herein to a particular design constraint or set of constraints.

Before describing specific details pertinent to femtocell access control and authentication, examples of contexts in which the described details should be useful will first be provided. Referring to FIG. 1, an example of a multiple access wireless communication system context is illustrated. An access point 100 (e.g., base station, Evolved Node B (eNB), or the like) includes multiple antenna groups, one including 104 and 106, another including 108 and 110, and an additional including 112 and 114. In FIG. 1, two antennas are shown for each antenna group, however, more or fewer antennas may be utilized for each antenna group. A mobile station 116 (MS) is in communication with the antennas 112 and 114, where the antennas 112 and 114 transmit information to the MS 116 over a forward link 120 and receive information from the MS 116 over a reverse link 118. An MS 122 is in communication with the antennas 106 and 108, where the antennas 106 and 108 transmit information to the MS 122 over a forward link 126 and receive information from the MS 122 over a reverse link 124. In a FDD system, the communication links 118, 120, 124 and 126 may use different frequency for communication. For example, the forward link 120 may use a different frequency then that used by the reverse link 118.

Each group of antennas and/or the area in which they are designed to communicate is often referred to as a sector of the access point. In the embodiment, antenna groups each are designed to communicate to MSs in a sector, of the areas covered by the access point 100.

In communication over the forward links 120 and 126, the transmitting antennas of the access point 100 utilize beamforming in order to improve the signal-to-noise ratio of forward links for the different MSs 116 and 124. Also, an access point using beamforming to transmit to MSs scattered randomly through its coverage causes less interference to MSs in neighboring cells than an access point transmitting through a single antenna to all its MSs.

Figure 2:
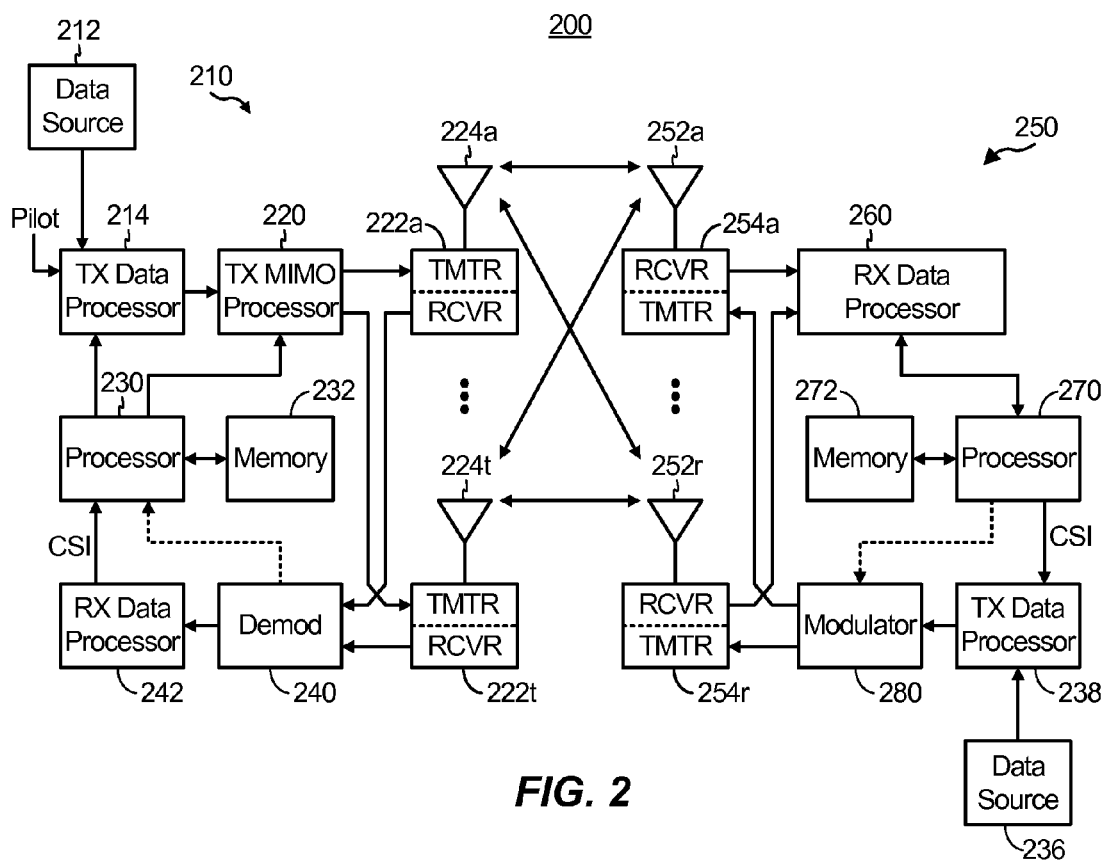
FIG. 2 is a block diagram illustrating a communication system.

FIG. 2 is a block diagram of an embodiment of a transmitter system 210 (also known as the access point) and a receiver system 250 (also known as MS) in a MIMO system 200. At the transmitter system 210, traffic data for a number of data streams is provided from a data source 212 to a transmit (TX) data processor 214.

In an embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230.

The modulation symbols for all data streams are then provided to a TX MIMO processor 220, which may further process the modulation symbols (e.g., for OFDM). The TX MIMO processor 220 then provides $N_T$ modulation symbol streams to $N_T$ transmitters (TMTR) 222a through 222t. In certain embodiments, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At the receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use, discussed further below. The processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reserve link message transmitted by the receiver system 250. The processor 230 then determines which pre-coding matrix to use for determining the beamforming weights then processes the extracted message.

Figure 3:
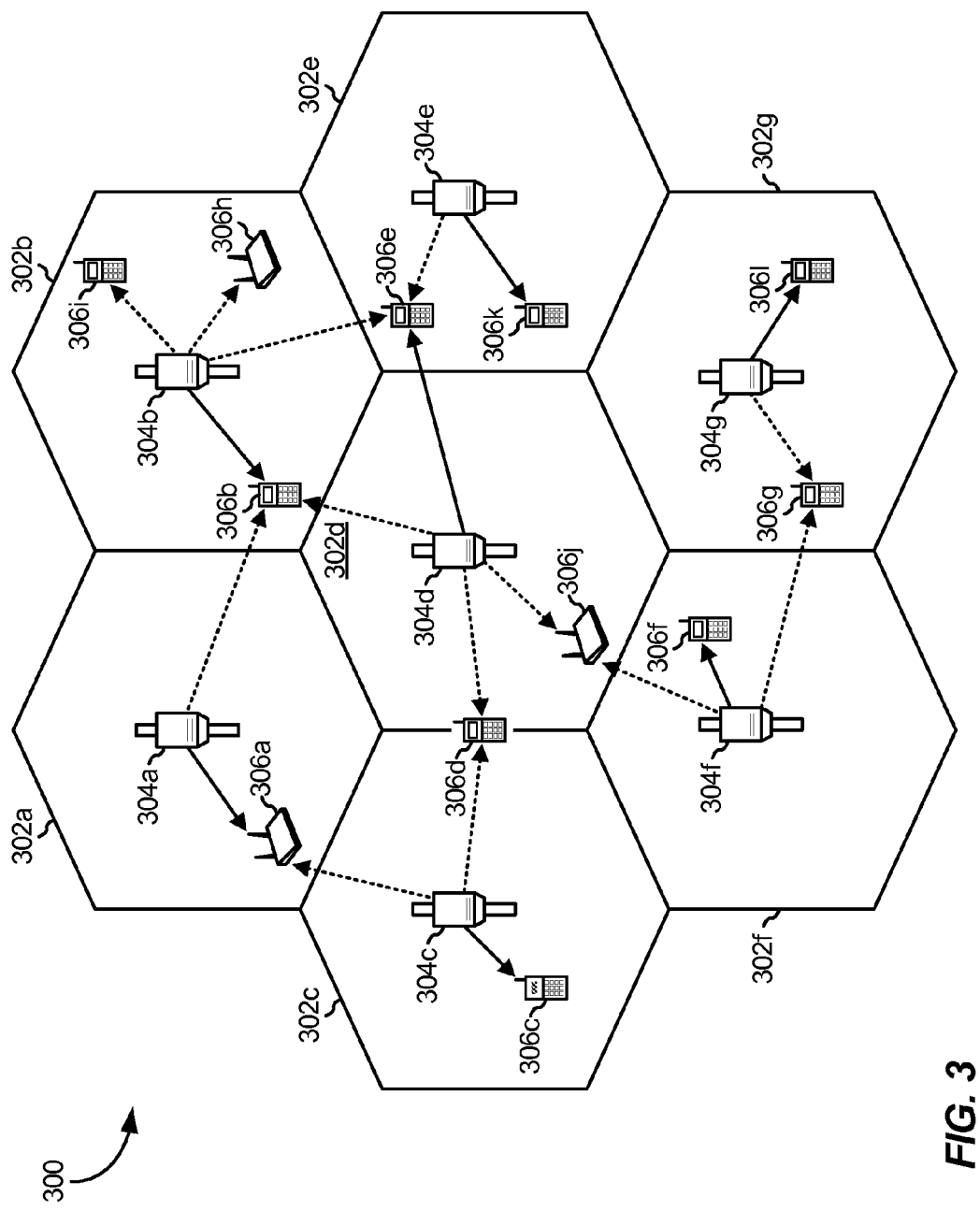
FIG. 3 illustrates an exemplary wireless communication system.

FIG. 3 illustrates an exemplary wireless communication system 300 configured to support a number of users, in which various disclosed embodiments and aspects may be implemented. As shown in FIG. 3, by way of example, the system 300 provides communication for multiple cells 302, such as, for example, macro cells 302a-302g, with each cell being serviced by a corresponding access point (AP) 304 (such as APs 304a-304g). Each cell may be further divided into one or more sectors. Various MSs 306, including MSs 306a-306k, also known interchangeably as UE or access terminals, are dispersed throughout the system. Each MS 306 may communicate with one or more APs 304 on a forward link (FL) and/or a reverse link (RL) at a given moment, depending upon whether the MS is active and whether it is in soft handoff, for example. The wireless communication system 300 may provide service over a large geographic region, for example, the macro cells 302a-302g may cover a few blocks in a neighborhood.

Figure 4:
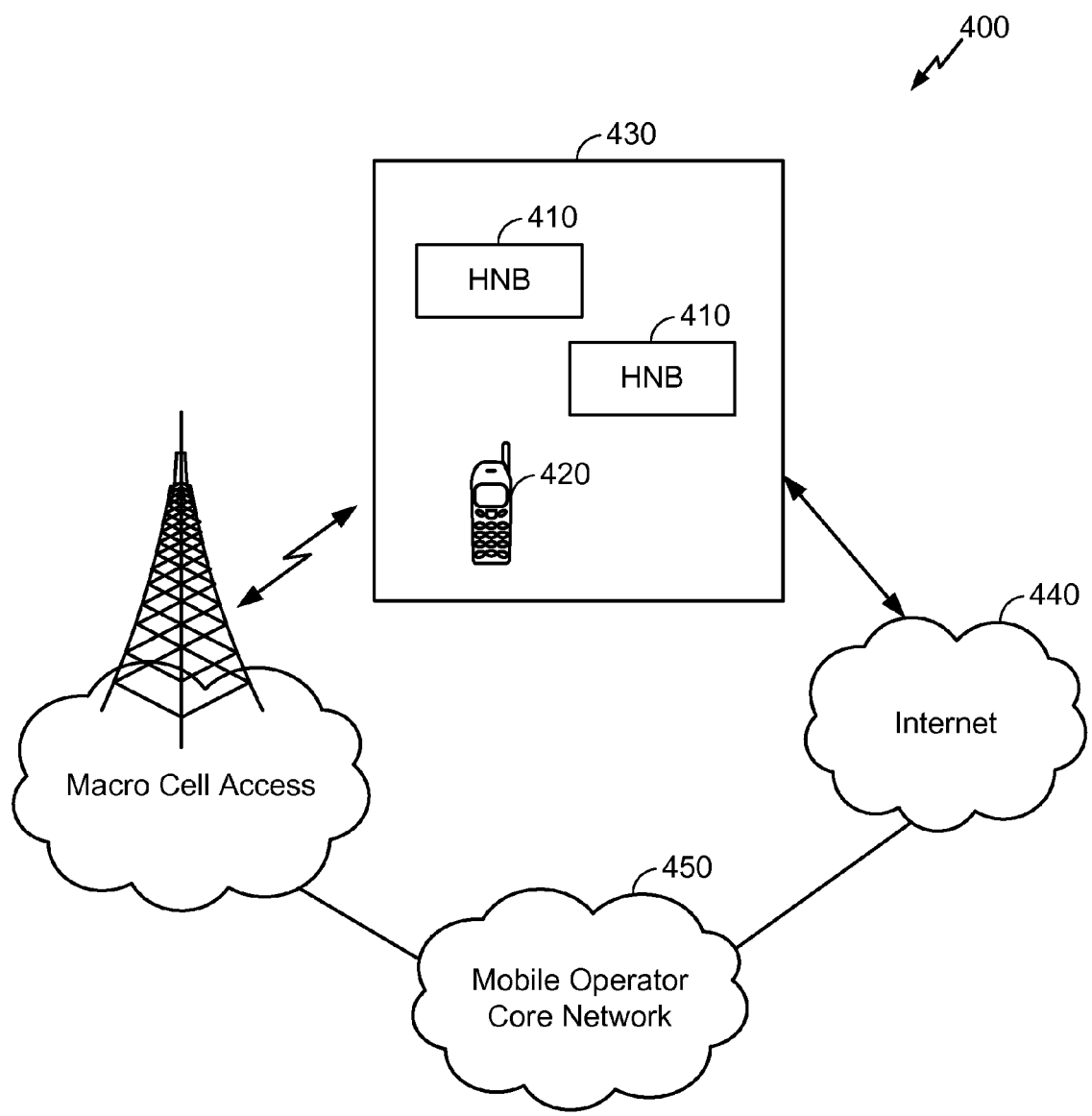
FIG. 4 illustrates an exemplary communication system to enable deployment of access point base stations within a network environment.

FIG. 4 illustrates an exemplary communication system 400 to enable deployment of access point base stations within a network environment. As shown in FIG. 4, the system 400 includes multiple access point base stations or Home Node B units (HNBs) or femto access points, such as, for example, HNBs 410, each being installed in a corresponding small scale network environment, such as, for example, in one or more user residences 430, and being configured to serve an associated, as well as alien, MS 420. Each HNB 410 is further coupled to the Internet 440 and a mobile operator core network 450 via a DSL router (not shown) or, alternatively, a cable modem (not shown).

Although embodiments described herein use 3GPP2 terminology, it is to be understood that the embodiments may be applied to 3GPP (Re199, Re15, Re16, Re17) technology, as well as 3GPP2 (1xRTT, 1xEV-DO Re10, RevA, RevB) technology and other known and related technologies. In such embodiments described herein, the owner of the HNB 410 subscribes to mobile service, such as, for example, 3G mobile service, offered through the mobile operator core network 450, and the MS 420 is capable to operate both in macro cellular environment and in residential small scale network environment. Thus, the HNB 410 is backward compatible with any existing MS 420.

Furthermore, in addition to the macro cell mobile network 450, the MS 420 can be served by a predetermined number of HNBs 410, namely the HNBs 410 that reside within the user's residence 430, and cannot be in a soft handover state with the macro network 450. The MS 420 can communicate either with the macro network 450 or the HNBs 410, but not both simultaneously. As long as the MS 420 is authorized to communicate with the HNB 410, within the user's residence it is desired that the MS 420 communicate with the associated HNBs 410.

Figure 5:
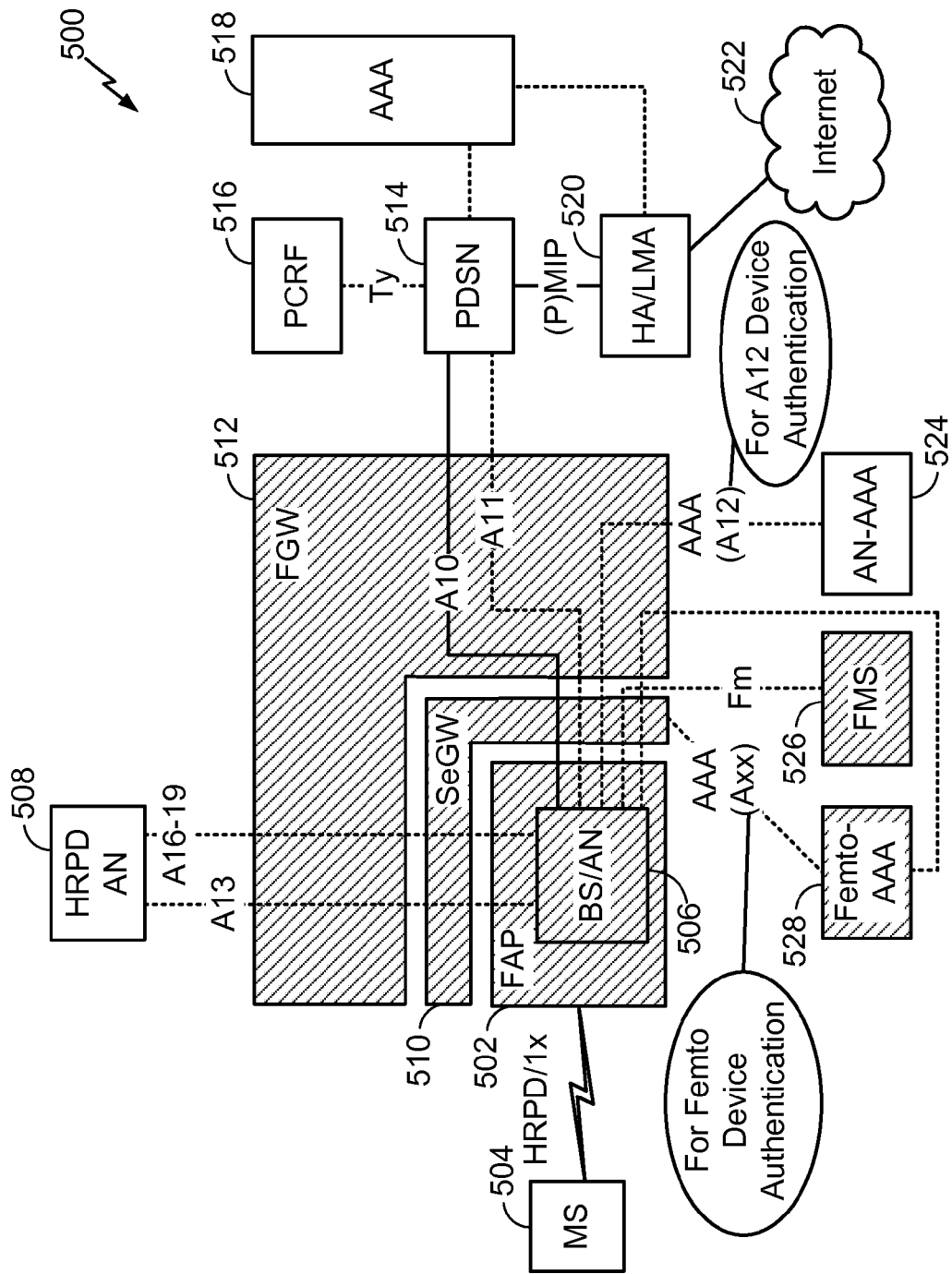
FIG. 5 is a block diagram showing an example of a system for femtocell access control in a high rate packet data (HRPD) packet-switched communications network.

Referring now to FIG. 5, for example, a system 500 enables access control of the FAP 502 relative to the mobile station 504 coupled to the FAP via a HRPD 1x wireless communication coupling. Dashed lines connecting block elements indicate control signal couplings, while solid lines indicate data signal couplings. Unshaded blocks indicate macro elements of the wireless communication system 500, while shaded blocks indicate femtocell elements. The system 500 may comprise packet-switched or circuit-switched network elements.

The system 500 comprises the FAP 502 further comprising a base station/access network (BS/AN) 506 in direct communication with an HRPD agent node 508 via a security gateway 510 and a femtocell gateway 512. The FAP BS/AN 506 is coupled to a Packet Data Serving Node (PDSN) 514 of the macro network for data signaling and control, again via the security gateway 510 and the femtocell gateway 512. The PDSN is coupled to a Policy and Charging Rules Function 516 and to a macro AAA server 518 via control signaling, and to a Home Anchor/Local Mobility Anchor (HA/LMA) 520 via data signaling. The HA/LMA is coupled, in turn, to the wide area network (Internet) 522 via data signaling. The FAP BS/AN 506 is further coupled to an access network (AN) AAA server 524 via the secure gateway 510 and the femtocell gateway 512 for A12 device authentication. The FAP BS/AN 506 is further coupled to a Femto Management System (FMS) server 526 via the secure gateway 510 for femtocell management signaling and to a femtocell AAA server 528 for AAA control signaling.

System 500 illustrates various options for storing authorization data used in femtocell access control. Authorization data may comprise an ACL and FAP type identifier. For purposes of the present disclosure, storage of authorization data may be said to occur at a storage point of the system 500. In some embodiments, the authorization data is stored at one of the femto or the Home AAA 528, at the access network AAA 524, or some combination of the foregoing. In other embodiments, the authorization data is stored at the FMS 526. The storage point (whether AAA 524, 528 or FMS 526) may store the authorization data in a local memory or storage device and provide the authorization data to an enforcement point (EP) or points in response to an authenticated request from the FAP 502. The FAP 502 may generate a request for authorization data when initialized, and/or periodically after being initialized, and/or in response to specific events at the FAP.

In addition, system 500 illustrates various options for enforcing authorization data used in femtocell access control. For purposes of the present disclosure, enforcement of an ACL may be said to occur at an enforcement point of system 500. The enforcement function includes denying access to network services to mobile stations connecting via a FAP for which the mobile stations are not authorized, depending on the FAP type, which permitting access to services to authorized mobile stations. Authorization may be subscriber based instead of device specific. Therefore a subscriber may migrate a subscription to a new device without losing authorization at the FAP, for example by migrating a RUIM/CSIM card from the old MS to the new MS. In some embodiments, the enforcement point may comprise the FAP 502. In other embodiments, the enforcement point may comprise the PDSN, or both the FAP and the PDSN. In some embodiments, the enforcement point entirely excludes the FAP.

For example, where the FAP 502 serves as an enforcement point, after authentication of the FAP the FAP may access the storage point through the secure gateway 512 to request the authorization data. If the storage point is one of AAA 524 or 528, the FAP 502 may use AAA protocol to request the authorization data. The FAP may obtain the address of the femto AAA 528 through auto-configuration from the FMS 526. If the storage point is the FMS 526, the FAP 502 may obtain the authorization data through FMS auto-configuration via the security gateway 512, after the FAP is authenticated by the SeGW 512. The FAP may use a Network Access Identifier (NAI) in the format of FEID@realm in the request, where the FEID is the femto equipment identifier, for example, a MAC address for the FAP 502. In response to the request, the storage point may transmit the authorization data to the FAP 502.

If functioning as an enforcement point, the PDSN may perform similar actions as just described for the FAP 512. In the alternative, or in addition, the femto gateway 512 may function as the enforcement point by performing operations the same or similar to those described above.

Regarding the authorization data provided to the enforcement point from the storage point, the ACL for 1xPS services may use the mobile station identifier (MSID) for the user. Each FAP may be associated with a list of allowed MSID's; for example, as part of the FAP profile in the femto AAA server 528. For HRPD PS services, the ACL may use the user's NAI to identify the mobile stations associated with the FAP, or the MSID. Each FAP may be associated with a list of allowed NAI's or MSID's; for example, as part of the FAP profile in the femto AAA server 528.

Figure 6:
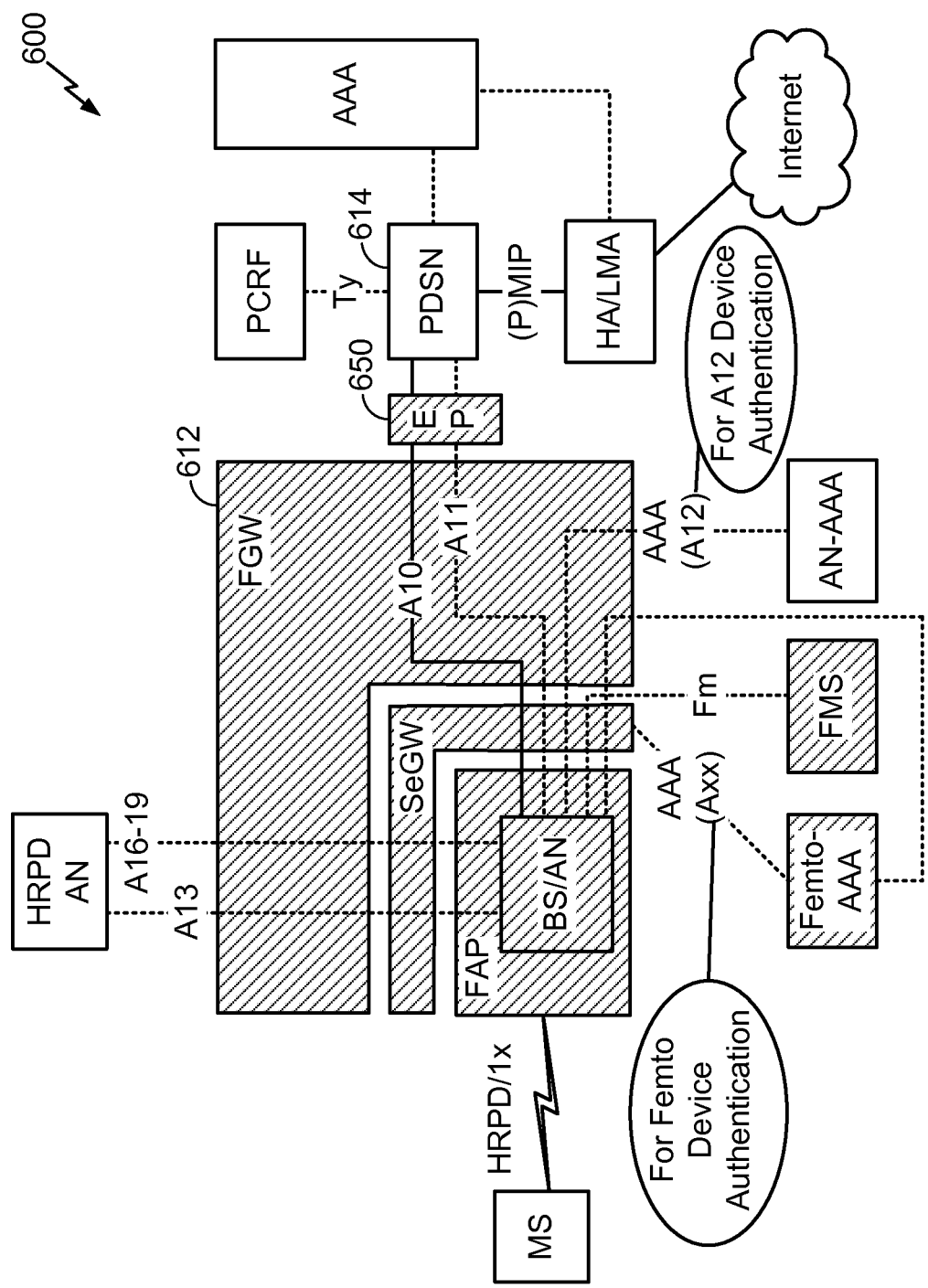
FIG. 6 is a block diagram showing another system similar to the system of FIG. 5, but with a separate enforcement point.

In some embodiments, a separate enforcement point may be implemented. For example, FIG. 6 shows a system 600 utilizing a separate enforcement point 650 interposed between the femto gateway 612 and the Packet Data Serving Node (PDSN) 614. Other elements of system 500 may have the functions and features as described for system 500. The interposed enforcement point 650 may enable the addition of enforcement functions without changing or modifying a pre-existing PDSN 514. Except for the enforcement function, the separate enforcement point 650 is transparent to the FGW 612 and PDSN 614, passing signals without modification. When taking enforcement action, the enforcement point 650 denies the FGW 512 access to the PDSN 514 for signals originating from an unauthorized mobile station, depending on the FAP type.

Figure 7:
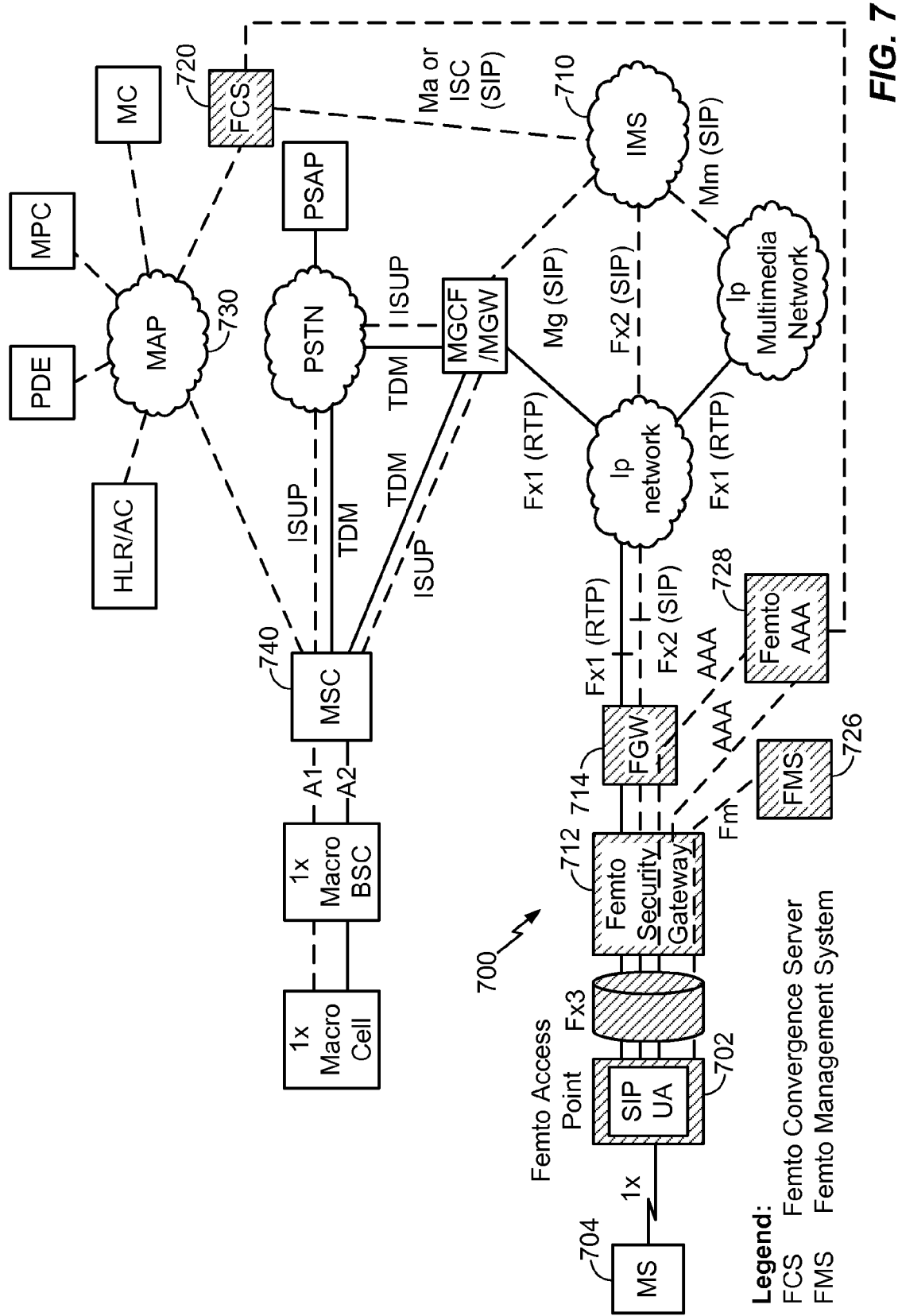
FIG. 7 is a block diagram showing an example of a packet-switched femtocell network architecture with a mobile switching center and IP network.

For further example, FIG. 7 shows a system 700 for implementing femtocell access control for a Session Initiation Protocol (SIP) based 1× CS network providing service to the mobile station (MS) 704. Conventions in the diagram are as adopted for FIGS. 5 and 6 described above. Macro elements are designated by the abbreviations keyed in the description hereinabove. The access control system 700 includes a remote storage point storing the authorization data and an enforcement point providing the enforcement function.

Either the FAP 702, the Femto Convergence Server (FCS) 720, or both, may provide enforcement functions. In some embodiments, the enforcement point excludes the FAP. If the FAP is an enforcement point, the FAP may obtain authorization data from the femto AAA 728 or the FMS 726, as previously described for system 500. If the FCS 720 is an enforcement point, the FCS may obtain the authorization data from the femto AAA 728. For example, the FCS may request the authorization data from the femto AAA using the format of FEID@ realm through AAA protocol after SIP registration for the MS is successful. In the alternative, the FCS may obtain the authorization data from the storage point through the IMS interfaces 710. The FCS may enforce an ACL and FAP type by communicating with the mobile switching center (MSC) 740 via the mobile access port (MAP) 730.

As in systems 500, 600, the storage point for authorization data may be the femto AAA. The authorization data may include the ACL as a list of allowed MSID's as part of the FAP 702 profile in the femto AAA 728. The MSID may be either IMSI or MIN/MDN.

Figure 8:
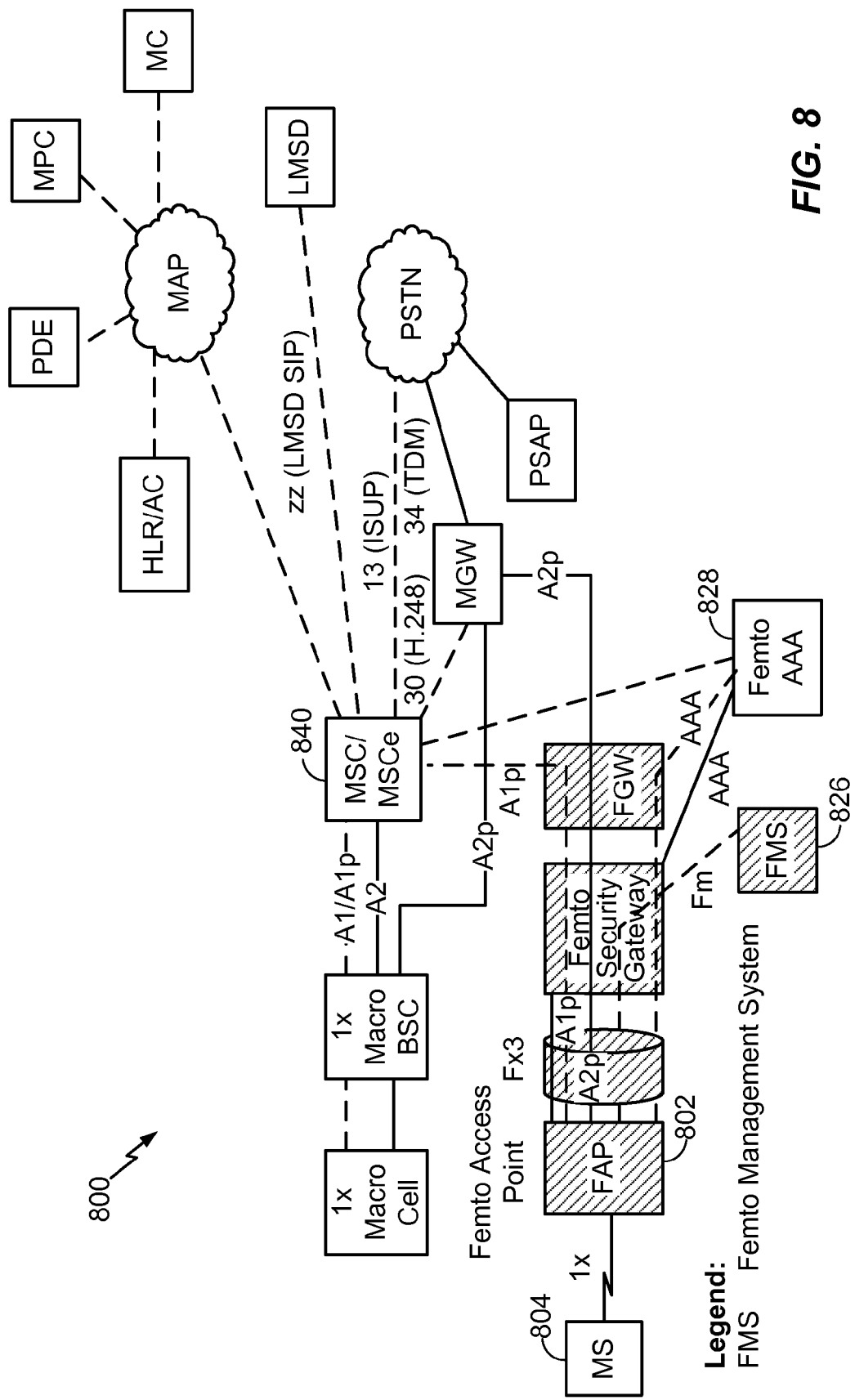
FIG. 8 is a block diagram showing an example of a circuit-switched femtocell network architecture with a mobile switching center.

For further example, FIG. 8 shows a system 800 for implementing femtocell access control for a Inter-Operability Specification (IOS) based 1× CS network providing service to MS 804. Conventions in the diagram are as adopted for FIGS. 5, 6 and 7 described above. Macro elements are designated by the abbreviations keyed in the description hereinabove. The access control system 800 includes a remote storage point storing the authorization data and an enforcement point providing the enforcement function.

Either the FAP 802, the mobile switching center (MSC) 840, or both, may provide enforcement functions. In some embodiments, the enforcement point excludes the FAP. If the FAP is an enforcement point, the FAP may obtain authorization data from the femto AAA 828 or the FMS 826, as previously described for system 500. If the MSC 840 is an enforcement point, the MSC may obtain the authorization data from the FAP 802 through A2p signaling. The authorization data may be encrypted. In the alternative, the MSC 840 may request the authorization data from the femto AAA using the format of FEID@ realm through AAA protocol after the user's first 1× registration is successful.

As in systems 500, 600 and 700, the storage point for authorization data may be the femto AAA 828. The authorization data may include the ACL as a list of allowed MSID's as part of the FAP 802 profile in the femto AAA 828. The MSID may be either IMSI or MIN/MDN.

Figure 9:
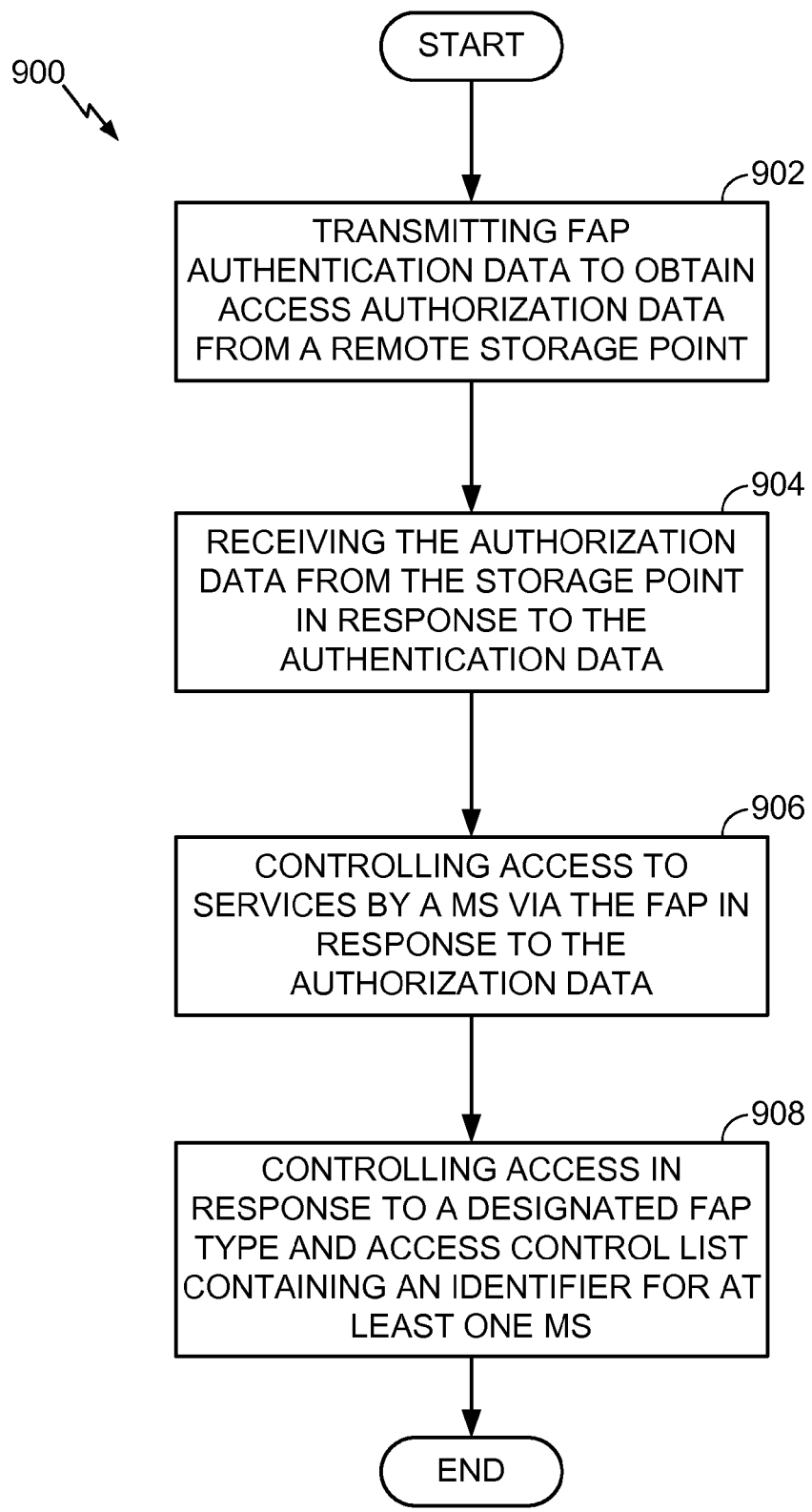
FIG. 9 is a flow diagram showing an example of wireless methods that include femto access control using authorization data stored at a remote storage point.

With reference to the forgoing figures and description, a method 900 for femtocell access control may include steps and operations as shown in FIG. 9. The method is generally described with reference to an enforcement point and a storage point. Various alternative elements for performing the functions of the enforcement point and the storage point have been described above, and further details regarding various alternatives are provided in the discussion below.

At 902, an enforcement point may request authorization data from a storage point, by transmitting FAP authentication data to a remote storage point. At 904, the enforcement point receives the authorization data, which may comprise an access control list (ACL) and FAP type identifier as described above, in response to the authentication data. At 906, the enforcement point controls access to services by a mobile station via the FAP, in response to the authorization data received from the storage point. More particularly, at 908 the enforcement point controls access in response to a designated FAP type and the ACL, which comprises an identifier for at least one mobile station authorized to access services via the FAP. In response to determining that the FAP type is "open association," the enforcement point permits access by all mobile stations and there is no use of the ACL by the FAP. In such cases, transmission of the ACL for the open FAP to the enforcement point is not needed, and may be omitted in the upstream process. In response to determining that the FAP type is some other value, the enforcement point may take other control action as detailed below.

Further with respect to block 908 of FIG. 9, in embodiments wherein the FAP is functioning as an enforcement point and the FAP type is "restricted association," the FAP restricts access to services exclusively to mobile stations that are identified in the ACL. For example, a 1× FAP may reject any air interface signaling (e.g., registration or origination messages) from a mobile station, unless the FAP determines that the mobile station is listed in the ACL. For further example, an HRPD FAP may reject the HRPD session negotiation for any mobile station not listed in the ACL. Likewise, for these embodiments if the FAP type is "signaling association," the FAP allows the mobile station to transmit signaling into the network; however it redirects the MS to a macro base station. For example, a 1× FAP may accept any air interface signaling, but if the MS is not listed in the ACL, the FAP may redirect the MS to the macro base station when the MS is establishing a call (e.g., in response to origination message or data burst message from the MS). For further example, a HRPD FAP may accept the HRPD session negotiation with the MS, but in response to determining that the MS is not included in the ACL, limits the main A10 setup for the MS to the PDSN. In such case, the FAP may also enforce a limit on the quantity of data that may be transmitted using the main A10 link to the PDSN, and redirect the MS to the macro base station in response to determining that the MS has exceeded the data quantity limit.

Further with respect to block 908, in embodiments wherein the Femto Convergence Server (FCS) is functioning as an enforcement point and the FAP type is "restricted association," the FCS prevents an MS from accessing the system in response to determining that the MS is not listed in the ACL for the FAP. For example, the FCS may reject the MS registration, and/or other SIP signaling such as SIP Invite, etc., if the MS is not listed in the ACL. In addition, for these embodiments if the FAP type is "signaling association," the FCS allows all mobile stations to transmit SIP signaling into the system and accept all MS registration or origination messages. However the FCS may redirect the MS to a macro base station when the MS is establishing a call.

Still further with respect to block 908, in embodiments wherein the PDSN is functioning as an enforcement point and the FAP type is "restricted association," the PDSN prevents access to network services by a MS that is not in the ACL for the FAP through which it is attempting to connect, with or without allowing PPP to be established. For example, if the home (main) AAA indicates to the PDSN that the MS is not listed in the ACL for the FAP's FEID, the PDSN may allow PPP to be established, and relocate A10 to a macro base station and release the A10 to the FAP. The PSDN may indicate to the MS through PPP VSP, and/or the PSDN may redirect the MS to the macro base station by indicating the reason (not listed in ACL for FAP). For HRPD, the FAP will then responsively tear down the HRPD session. For further example, the PSDN may not permit PPP to be established for the unlisted MS, and release the A10 to the FAP by indicating that the MS is not in the FAP's ACL. The PDSN may send a LCP termination request to the MS and indicate to the MS though either PPP VSP or LCP termination option; and/or the FAP can redirect the MS to the macro base station by indicating the reason, and then tear down the HRPD session. Optionally, the AAA may provide a copy of the ACL to the PDSN so that the PDSN does not need to communicate with the AAA for PPP authentication for other mobile stations not included in the ACL.

In addition, for embodiments wherein the PSDN is an enforcement point and the FAP type is "signaling association," the PDSN allows a MS to establish PPP in response to determining that the MS is not in the ACL for the FAP (e.g., via a signal from the home AAA), but then operates to transfer the MS to a macro base station. For example, in response to receiving data, the PDSN may send limited data to the FAP and indicate to the FAP that the MS is not in its ACL via A11 signaling. The PDSN may then buffer any additional data until the macro base station sets up an second A10 for the MS with the PDSN, after which the PDSN releases the first A10 to the FAP. The PDSN may notify the MS via the PPP VSP, and/or the FAP may redirect the MS to the macro base station by indicating the reason. For further example, the PDSN may instead immediately move the A10 to the selected macro base station and release the A10 to the FAP by indicating to the FAP that the MS is not in its ACL, again either through PPP VSP or by redirecting the MS to the macro base station by indicating the reason.

Still further with respect to block 908, in embodiments wherein the mobile switching center (MSC) is functioning as an enforcement point and the FAP type is "restricted association," the MSC rejects the registration message and any other A1/A1p signaling from the mobile station if the MS is not listed in the ACL for the FAP. Conversely, in response to determining that the MS is listed in the ACL, the MSC handles the registration message and any other A1/A1p signaling from the mobile station normally; i.e., it does not reject such signals. In addition, for these embodiments if the FAP type is "signaling association," the MSC allows all mobile stations to transmit registration signals into the system. However, in response to determining that an MS is not listed in a FAP's ACL, the MSC may redirect the MS to the selected macro base station when the MS is establishing the call. The foregoing procedures may also be used for 1x packet switched networks.

Figure 10:
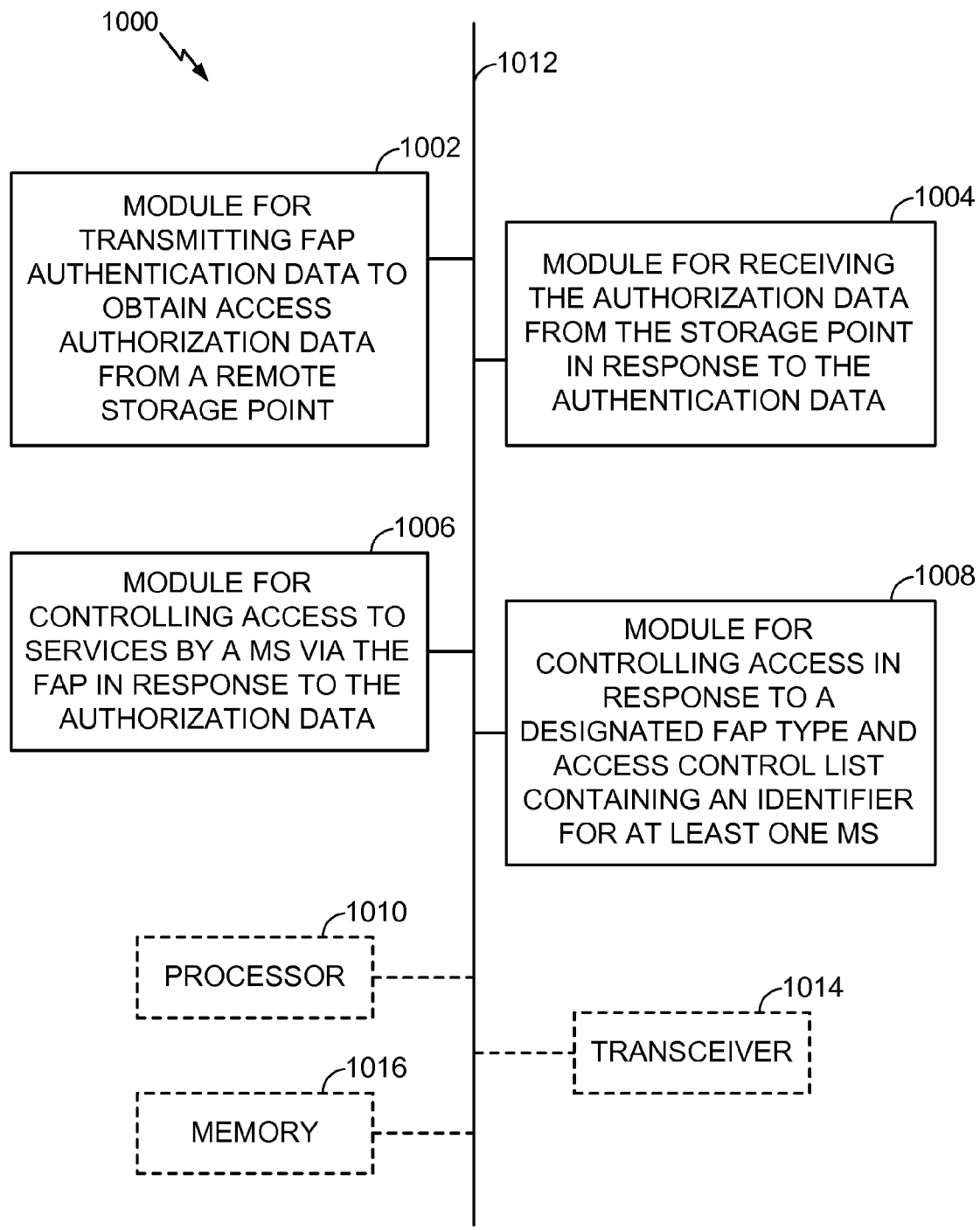
FIG. 10 is a block diagram showing an example of an apparatus for facilitating femto access control using authorization data stored at a remote storage point.

Consistent with the method 900, and as further illustrated by FIG. 10, an apparatus 1000 may function as an enforcement point in a wireless communication system. The apparatus 1000 may comprise an electronic component or module 1002 for requesting authorization data from a storage point, by transmitting FAP authentication data to a remote storage point. The apparatus 1000 may comprise an electronic component or module 1004 for receiving the authorization data, which may comprise an access control list (ACL) and FAP type identifier, in response to the authentication data. The apparatus 1000 may comprise an electronic component or module 1006 for controlling access to services by a mobile station via the FAP, in response to the authorization data received from the storage point. More particularly, the apparatus 1000 may comprise an electronic component or module 1008 for controlling access in response to a designated FAP type and the ACL, which comprises an identifier for at least one mobile station authorized to access services via the FAP. Module 1008 may operate as detailed above with respect to block 908 of method 900, depending on the identity of the enforcement point and the FAP type indicated by the authorization data.

The apparatus 1000 may optionally include a processor module 1010 having at least one processor; in the case of the apparatus 1000 configured as a communication network entity, rather than as a general purpose microprocessor. The processor 1010, in such case, may be in operative communication with the modules 1002-1008 via a bus 1012 or similar communication coupling. The processor 1010 may effect initiation and scheduling of the processes or functions performed by electrical components 1002-1008.

In related aspects, the apparatus 1000 may include a transceiver module 1014. A stand alone receiver and/or stand alone transmitter may be used in lieu of or in conjunction with the transceiver 1014. In further related aspects, the apparatus 1000 may optionally include a module for storing information, such as, for example, a memory device/module 1016. The computer readable medium or the memory module 1016 may be operatively coupled to the other components of the apparatus 1000 via the bus 1012 or the like. The memory module 1016 may be adapted to store computer readable instructions and data for effecting the processes and behavior of the modules 1002-1008, and subcomponents thereof, or the processor 1010, or the methods disclosed herein, and other operations for wireless communications. The memory module 1016 may retain instructions for executing functions associated with the modules 1002-1008. While shown as being external to the memory 1016, the modules 1002-1008 can include at least portions within the memory 1016.

In further related aspects, the memory 1016 may optionally include executable code for the processor module 1010 and/or ones of the modules 1002-1008 to cause the apparatus 1000 perform a method that comprises the steps of: (a) transmitting FAP authentication data from the FAP to obtain MS access authorization data; (b) receiving the authorization data for the FAP from the storage point, in response to the FAP authentication data; and (c) to controlling wireless network access by the MS via the FAP at the enforcement point, in response to the authorization data.

Methods and systems for controlling access to a FAP as disclosed herein may rely on storage of the FAP's access control list by a trusted entity, rather than by the FAP itself. This may prevent or discourage a user in possession of a FAP from tampering with the ACL to permit use of the FAP to provide access to mobile stations that are not on the ACL. However, for effective operation it is important to ensure that the authorization data retrieved for the FAP is indeed the correct data. For example, control will not be effective if the authorization data incorrectly indicates that the FAP type is "open association" when it should be restricted. Some users may attempt to obtain such a result, for example by spoofing the FEID for an unrestricted FAP, using a restricted FAP. Methods and apparatus for preventing or discouraging spoofing of FAP FEID's are therefore discussed below.

Figure 11:
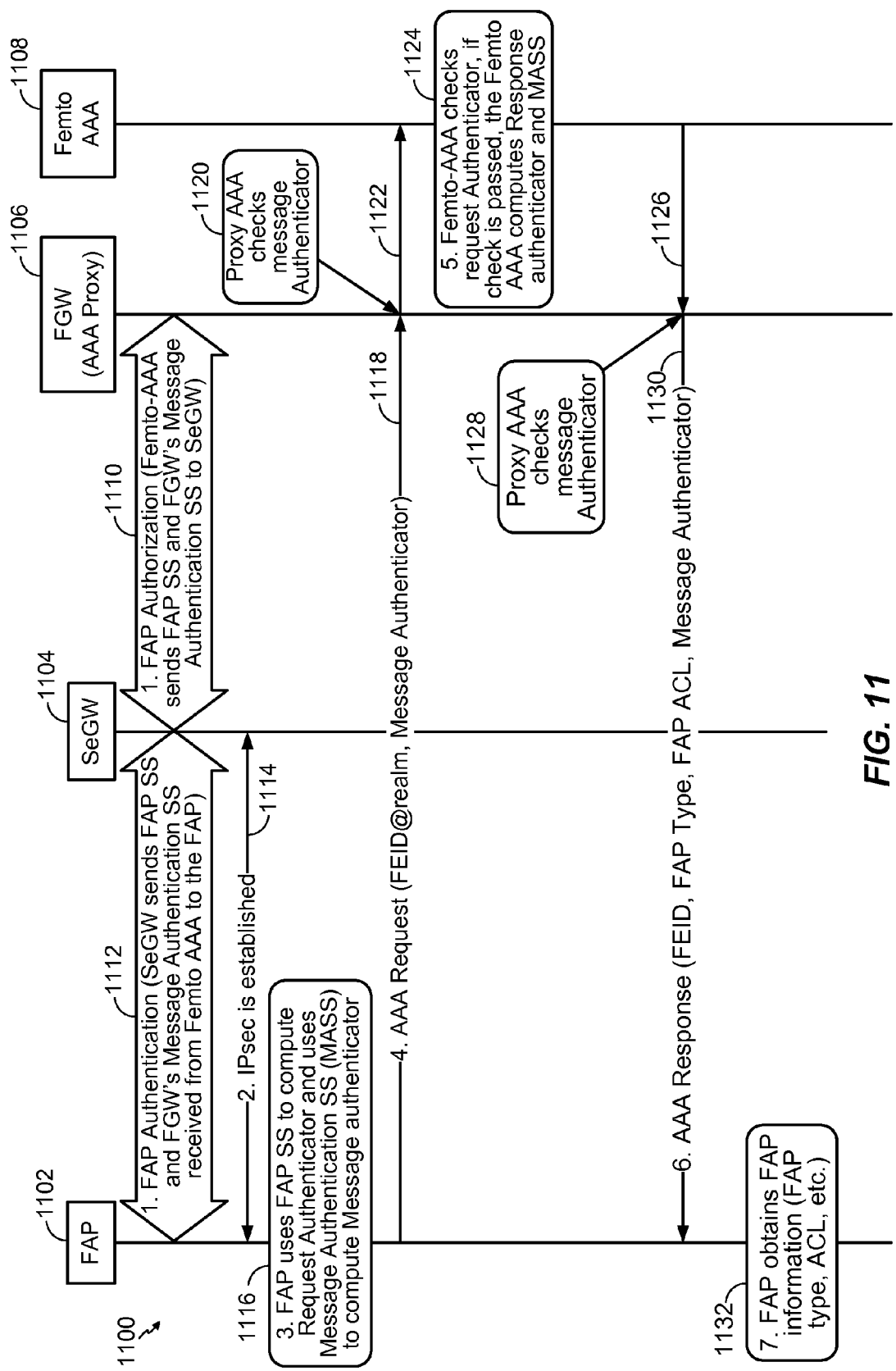
FIG. 11 is a sequence diagram showing an example of an authentication method for femtocell authentication to an authorization server.

FIG. 11 shows a message and procedure sequence 1100 involving four nodes of a femtocell system: a FAP 1102, a security gateway (SeGW) 1104, a femtocell gateway (FGW) 1106 operating as an AAA proxy, and a femto AAA 1108. Initially at 1110, the AAA 1108 transmits a FAP shared secret (SS) and FGW's message authenticator shared secret (MASS) to the SeGW 1104. The AAA may possess a map of FEIDs for FAPs that relates particular FEIDs to particular IP addresses, which it uses to direct the FAP SS and MASS to an authentic FAP. The FAP SS may comprise its IP address.

The SeGW 1104 establishes IP security 1114 with the FAP 1102 and forwards the shared secret data 1112 to the FAP. The FAP uses 1116 the FAP SS to compute a request authentication value, for example applying a cryptographic hash to the FAP SS. Similarly, the FAP uses 1116 the MASS to compute a message authenticator value.

The FAP 1102 then generates an AAA request comprising its identifier (e.g., FEID@realm), the request authentication value and the message authenticator value, which it transmits 1118 to the FGW 1106. The FGW checks 1120 the message authenticator value, for example by generating a counterpart using the MASS and comparing. In response to determining that the message authenticator value is authentic, the FGW forwards 1122 the AAA request to the femto AAA 1108.

The femto AAA checks 1124 the request authentication value, for example by generating a counterpart using the FAP SS and comparing values. In response to determining that the request authentication value is valid for the FAP 1102, the Femto AAA generates a response message authenticator value using the MASS, and transmits a response including the FEID, FAP Type, FAP ACL, and response message authenticator value to the FGW 1106. The FGW checks 1128 the response message authenticator value, for example by generating a counterpart using the MASS and comparing. In response to determining that the response message authenticator value is authentic, the FGW forwards 1130 the response message to the FAP 1102. The FAP (or other enforcement point) therefore obtains 1132 the correct authorization data including the FAP Type and ACL for use in access control.

Figure 12:
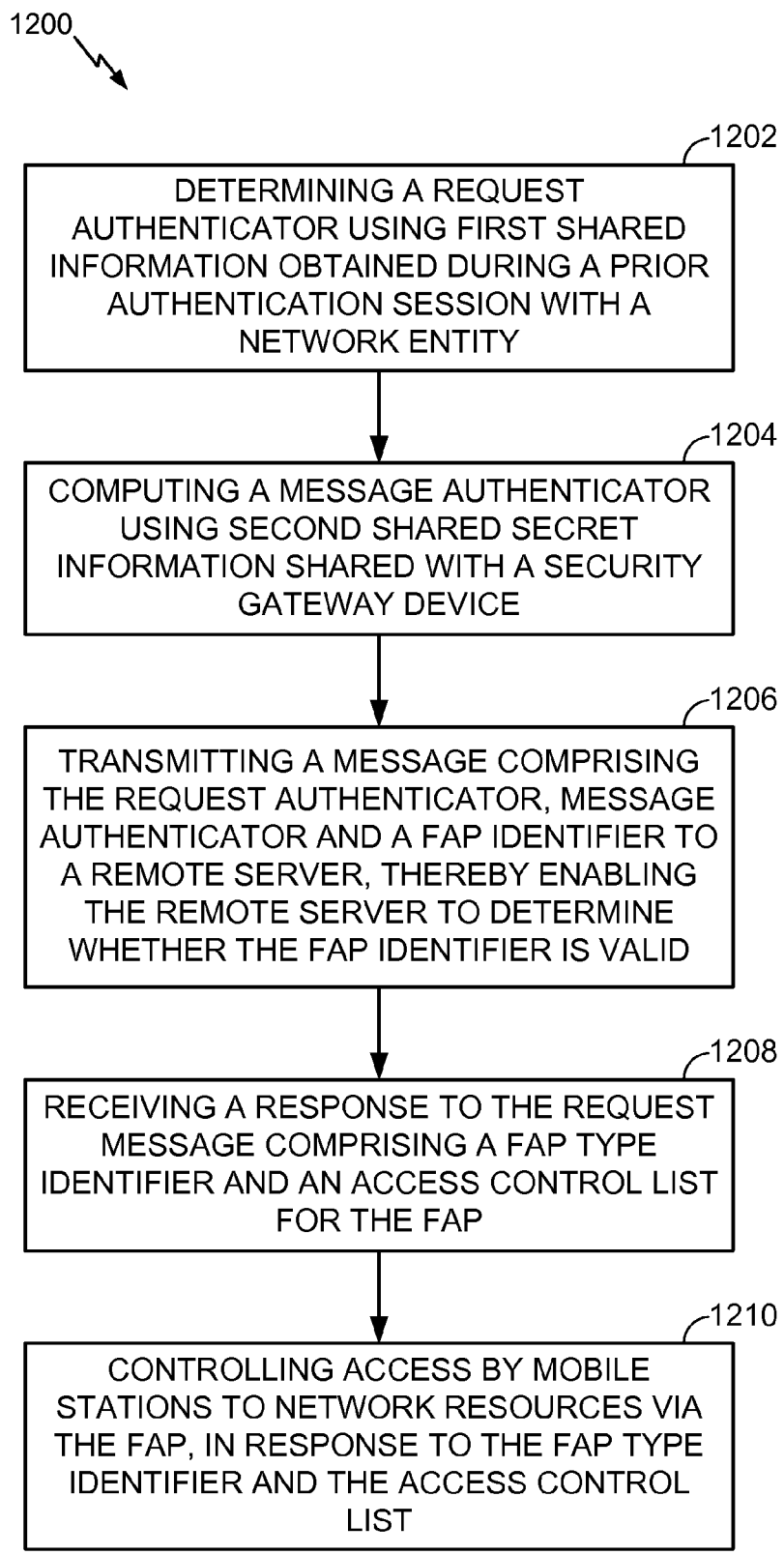
FIG. 12 is a flow diagram showing exemplary steps of an authentication method for femtocell authentication according to the sequence of FIG. 11.

Consistent with the procedures illustrated by FIG. 11, a method 1200 for preventing spoofing of a FAP FEID to obtain incorrect authorization data may include steps and operations as shown in FIG. 12. Method 1200 may comprise computing 1202 a request authenticator at a femto access point in a wireless communication network, using first secret information shared with a remote Authorization, Authentication and Accounting server (AAA). The method 1200 may further comprise computing a message authenticator at the FAP using second secret information shared with a security gateway device for the FAP, and including the message authenticator in the request message 1206. A femto gateway device (FGW) interposed between the AAA and the SeGW may forward the request message from the FAP to the AAA, in response to determining that the message authenticator is valid. The FGW may check validity of the message authenticator by independently computing a comparison value using the second secret information.

The method 1200 may further comprise transmitting 1206 a request message from the FAP to the AAA, the request message comprising a FAP identifier and the request authenticator, thereby enabling the AAA to determine whether the FAP identifier is valid for the FAP. The foregoing steps may enable the AAA to determine whether the FAP identifier is valid for the FAP, by independently computing a check value for the request authenticator using the first secret information.

At 1208, the FAP may receive a response to the request message generated by the AAA in response to determining that the FAP identifier is valid for the FAP. This response may comprise a FAP type identifier and an access control list for the FAP. The FAP may therefore control access 1210 by mobile stations to the FAP, using the FAP type identifier and the access control list.

Method 1200 may include additional aspects that may be performed using components other than the FAP. For example, the AAA may transmit a response to the request message in response to determining that the FAP identifier is valid for the FAP, the response comprising the message authenticator and an access control list for the FAP. A security gateway may forward the response from the AAA to the FAP, in response to determining that the message authenticator is valid. The FAP may control access by mobile stations to the FAP, using the access control list from the response. The additional aspects may further comprise directing the first secret information to the FAP as determined by a map relating the FAP identifier to a computer network address for the FAP, prior to computing the request authenticator. In methods that include computing a message authenticator at the FAP using second secret information shared with a SeGW and/or AAA may direct the first secret information and the second secret information to the FAP as determined by a map relating the FAP identifier to a computer network address for the FAP, prior to computing the request authenticator.

Figure 13:
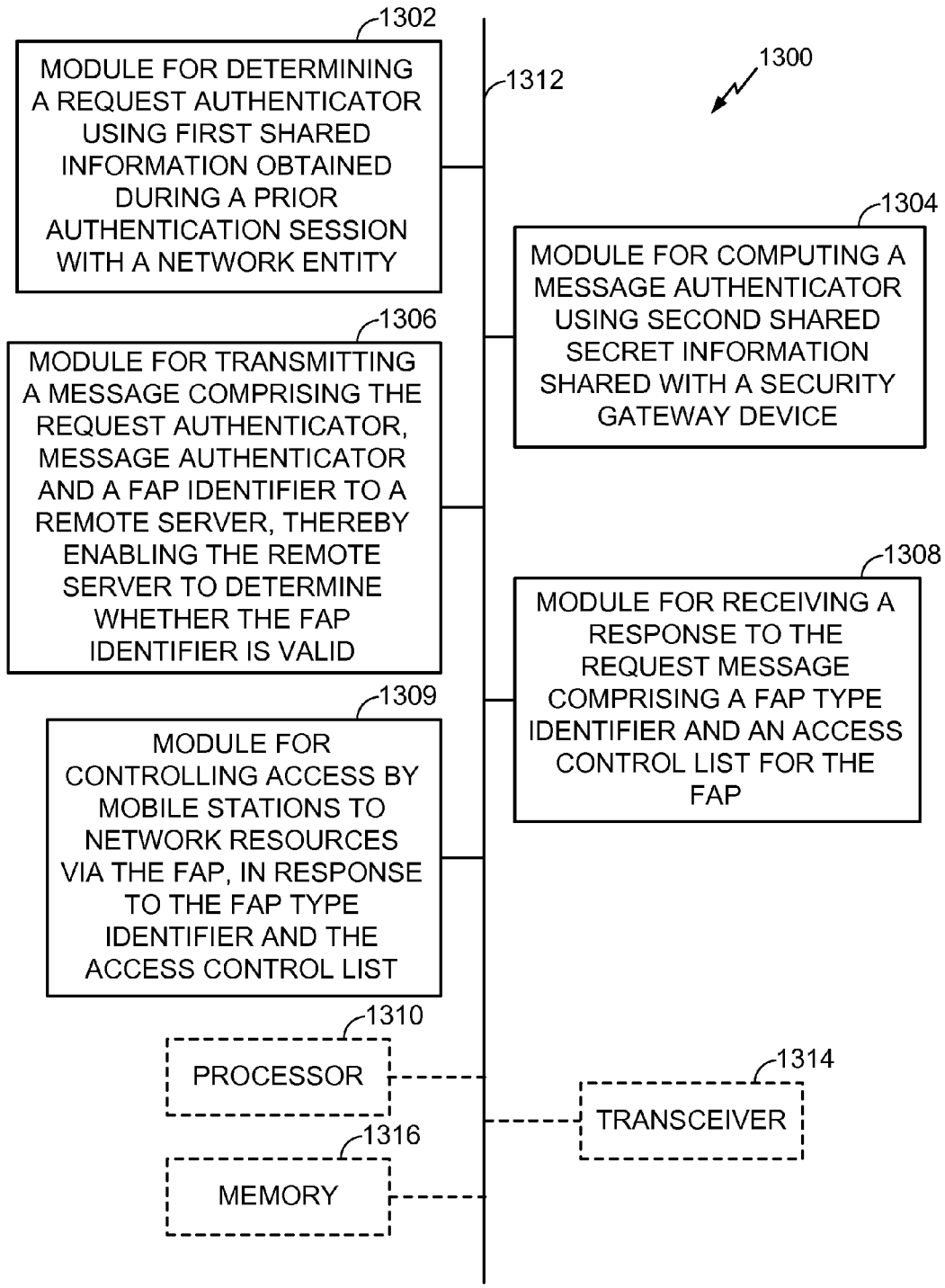
FIG. 13 is a block diagram showing an example of an apparatus for femtocell authentication according to the sequence of FIG. 11.

Consistent with method 1200, and as further illustrated by FIG. 13, an apparatus 1300 may function as a femtocell access point in a wireless communication system. The apparatus 1300 may comprise an electronic component or module 1302 for computing a request authenticator in a wireless communication network, using first secret information shared with a remote femto AAA server. The apparatus 1300 may comprise an electronic component or module 1304 for computing a message authenticator at the FAP using second secret information shared with a security gateway device for the FAP. The apparatus 1300 may comprise an electronic component or module 1306 for transmitting a request message from the FAP to the AAA, the request message comprising a FAP identifier, message authenticator and the request authenticator, thereby enabling the AAA to determine whether the FAP identifier is valid for the FAP. The apparatus 1300 may further comprise an electronic component or module 1308 for receiving a response to the request message generated by the AAA in response to determining that the FAP identifier is valid for the FAP, the response comprising a FAP type identifier and an access control list for the FAP. Accordingly, the apparatus 1300 may comprise an electronic component or module 1309 for controlling access 1210 by mobile stations to the FAP, using the FAP type identifier and the access control list.

The apparatus 1300 may optionally include a processor module 1310 having at least one processor; in the case of the apparatus 1300 configured as a communication network entity, rather than as a general purpose microprocessor. The processor 1310, in such case, may be in operative communication with the modules 1302-1309 via a bus 1312 or similar communication coupling. The processor 1310 may effect initiation and scheduling of the processes or functions performed by electrical components 1302-1309.

In related aspects, the apparatus 1300 may include a transceiver module 1314 for communicating with a mobile station. A stand alone receiver and/or stand alone transmitter may be used in lieu of or in conjunction with the transceiver 1314. In further related aspects, the apparatus 1300 may optionally include a module for storing information, such as, for example, a memory device/module 1316. The computer readable medium or the memory module 1316 may be operatively coupled to the other components of the apparatus 1300 via the bus 1312 or the like. The memory module 1316 may be adapted to store computer readable instructions and data for effecting the processes and behavior of the modules 1302-1309, and subcomponents thereof, or the processor 1310, or the methods disclosed herein, and other operations for wireless communications. The memory module 1316 may retain instructions for executing functions associated with the modules 1302-1309. While shown as being external to the memory 1316, it is to be understood that the modules 1302-1309 may exist at least partly within the memory 1316.

In further related aspects, the memory 1316 may optionally include executable code for the processor module 1310 and/or ones of the modules 1302-1309 to cause the apparatus 1300 perform a method that comprises the steps of: (a) computing a request authenticator at a femto access point (FAP) in a wireless communication network, using first secret information shared with a remote server; and (b) transmitting a request message from the FAP to the remote server, the request message comprising a FAP identifier and the request authenticator, thereby enabling the remote server to determine whether the FAP identifier is valid for the FAP. Similarly, the memory 1316 may optionally include executable code for the processor module 1310 to cause the apparatus 1300 to perform method 1200 as described in connection with FIG. 12 above.

Figure 14:
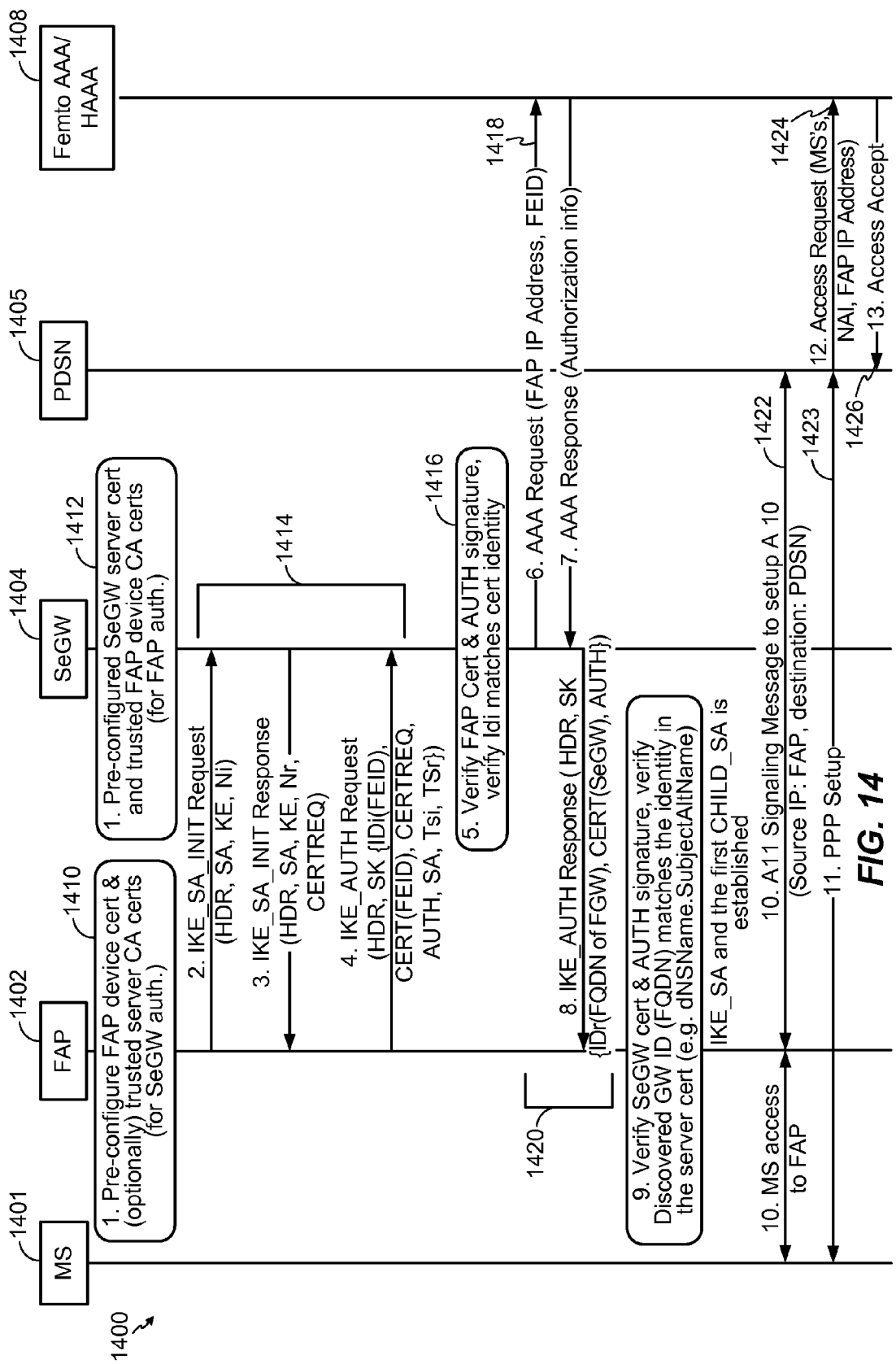
FIG. 14 is a sequence diagram showing another example of a method for femtocell authentication.

Method 1200 and apparatus 1300 may be adapted to prevent FAP spoofing in related contexts. For example, FIG. 14 shows a message and procedure sequence 1400 involving five nodes of a HRPD femtocell system using a PDSN enforcement point. The five nodes are: an MS 1401, a FAP 1402, a security gateway (SeGW) 1404, a PDSN 1405, a femto AAA/HAAA 1408. As used herein, femto AAA/HAAA refers to either a femto AAA, an HAAA, or both. The FAP and SeGW are preconfigured 1410, 1412 with cryptographic certifications for each other. The FAP and SeGW exchange a message sequence 1404 for authenticating the FAP to the SeGW.

After FAP authentication 1416, the SeGW 1404 transmits 1418 the FAP's IP address to the femto AAA 1406, in addition to the FEID. The femto AAA/HAAA maintains mapping between the FAP's IP address and the FEID. Authorization data is propagated back to the FAP at 1420.

During A10 setup, the PDSN 1405 obtains the FAP's IP address as being the source IP address for the A11 signaling message 1422 from the FAP to the PDSN. During PPP setup 1423, the PDSN transmits 1424 the IP address of FAP 1402 and the NAI of MS 1401 to femtoAAA/HAAA 1408.

The HAAA, using the IP address of the FAP, may use the femto AAA to check the corresponding FEID and associated ACL to verify that the MS's NAI is included in the ACL. In response to determining that the FEID/FAP IP address mapping is not authentic, the femto AAA/HAAA will transmit an Access Reject message to the PDSN. In response to determining that the FEID/FAP IP address mapping is authentic and the NAI is included in the ACL, the femto AAA/HAAA will transmit an Access Accept message to the PDSN. In response to determining that the FEID/FAP IP address mapping is authentic and the NAI is not included in the ACL, the femto AAA/HAAA will transmit an Access Accept message to the PDSN with an indication that the MS NAI is not listed in the ACL. The PDSN may pass this indication to the FAP, so that the FAP may redirect the MS to a macro base station if the FAP type is signaling association.

When the A10 is moving from a first FAP to a second FAP and the PDSN is unable to determine whether this is from FAP or RAN, the PDSN may send an access request to the AAA including the IP address of the FAP/RAN. The femto AAA/HAAA may thereby determine if the IP address belongs to the FAP and is valid, and transmit an indication thereof back to the PDSN. Otherwise, the PDSN may send only the access request to the femto AAA/HAAA including the FAP's IP address. The PDSN may use its configuration data to determine whether the A10 is for a FAP or RAN. Optionally, the PDSN may transmit an LCP echo request to the MS after A10 establishment, to verify that the A10 movement is triggered by the MS.

Like sequence 1100, sequence 1400 exemplifies certain novel aspects of the present technology. For example, when a FAP is being authenticated by an operator's network (e.g., by SeGW entity, with or without involvement by the AAA in this authentication process) using an FEID or other FAP identifier for authentication, an entity in the operator's network selects a value and assigns it to the FAP as shared information. This shared secret information may be either an actual shared secret or an IP address assigned by the network for the FAP authentication session. The shared information (either FEID/shared secret or FEID/FAP IP address) is also stored in the network.

In response to a MS trying to access service through a FAP, the FAP includes the shared information and forwards it to the network. The FAP may either include the information directly in a signal to the network, as in the case of IP address, or indirectly as a cryptographic value generated using a hash function, in case the shared information needs to be kept secret. The information stored in the previous step (FAP authentication) is used by the network to make access control decisions. One or more entities in the network may be involved in the network access control process; for example, AAA and/or a FGW, or AAA and/or a PDSN in the case of packet data service.

It is noted that various aspects are described herein in connection with a mobile station. A mobile station can also be referred to as a system, a user device, a subscriber unit, subscriber station, terminal, mobile device, remote station, remote terminal, access terminal, user terminal, user agent, or access terminal. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or medium.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method, comprising:
   in a wireless communication network comprising a femto access point (FAP) configured for wireless communication with at least one authorized mobile station (MS) accessing the network via the FAP, transmitting FAP authentication data from the FAP to obtain MS access authorization data stored by a remote storage point in communication with the FAP;
   receiving the MS access authorization data for the FAP from the storage point at an enforcement point (EP), in response to the FAP authentication data, wherein the EP excludes the FAP; and controlling, at the EP, wireless network access by the MS via the FAP, in response to the MS access authorization data.

2. The method of claim 1, wherein the wireless communication network comprises any one of the group consisting of a Session Initiation Protocol (SIP) based circuit-switched network, an Interoperability Specification (IOS) based circuit-switched network, and a packet-switched network.

3. The method of claim 1, further comprising generating the MS access authorization data in response to determining that the FAP authentication data is valid.

4. The method of claim 1, wherein the storage point comprises any one of the group consisting of an AN-AAA, an AAA, and a HAAA.

5. The method of claim 1, wherein the EP comprises a Femto Gateway (FGW).

6. The method of claim 1, wherein the EP comprises a separate enforcement point that is not one of a Femto Convergence Server (FCS), a Femto Gateway (FGW), a Packet Data Serving Node (PDSN), or a mobile switching center (MSC).

7. The method of claim 1, wherein the wireless communication network is a circuit-switched network, and wherein the EP comprises any one of the group consisting of a Femto Convergence Server (FCS), a Femto Gateway (FGW), and a separate enforcement point.

8. The method of claim 1, wherein the wireless communication network is a packet-switched network, and wherein the EP comprises any one of the group consisting of a Packet Data Serving Node (PDSN), a Femto Gateway (FGW), and a separate enforcement point.

9. The method of claim 1, wherein the wireless communication network is an Interoperability Specification (IOS) based circuit-switched network, and wherein the EP comprises any one of the group consisting of a mobile switching center (MSC), a Femto Gateway (FGW), and a separate enforcement point.

10. The method of claim 1, wherein the MS access authorization data comprises an access control list comprising identifiers for authorized mobile stations.

11. The method of claim 1, wherein the MS access authorization data further comprises a FAP type identifier.

12. The method of claim 1, wherein controlling the wireless network access by the MS via the FAP comprises preventing the MS from accessing the wireless network in response to determining that the MS is not listed in an access control list for the FAP.

13. The method of claim 12, wherein controlling the wireless network access by the MS via the FAP comprises redirecting the MS to a macro base station.

14. The method of claim 1, wherein controlling the wireless network access by the MS via the FAP comprises permitting limited access to the wireless network.

15. The method of claim 14, wherein controlling the wireless network access by the MS via the FAP comprises redirecting the MS to a macro base station after the permitting the limited access, and then tearing down a communication session between the MS and the FAP.

16. A communications apparatus, comprising:
a memory that retains instructions: for transmitting femto access point (FAP) authentication data from a FAP to obtain MS access authorization data stored by a remote storage point in communication with the FAP; for receiving the MS access authorization data for the FAP from the storage point at an enforcement point (EP), in response to the FAP authentication data, wherein the EP excludes the FAP; and for controlling, at the EP, wireless network access by the MS via the FAP, in response to the MS access authorization data; and
a processor that executes the instructions.

17. The communications apparatus of claim 16, wherein the EP comprises a Femto Gateway (FGW).

18. The communications apparatus of claim 16, wherein the remote storage point comprises an Authorization, Authentication and Accounting (AAA) server.

19. The communications apparatus of claim 16, wherein the memory retains further instructions for generating a request for the MS access authorization data using secret information shared with the storage point, the request comprising an identifier for the FAP and the FAP authentication data.

20. The communications apparatus of claim 16, wherein the memory retains further instructions for controlling access to a wireless communication network (WCN) via the FAP in accordance with an access control list included in the MS access authorization data, the access control list comprising identifiers for mobile stations authorized to access the WCN via the FAP.

21. A communications apparatus, comprising:
means for transmitting femto access point (FAP) authentication data from a FAP to obtain MS access authorization data stored by a remote storage point in communication with the FAP;
means for receiving the MS access authorization data for the FAP from the storage point at an enforcement point (EP), in response to the FAP authentication data, wherein the EP excludes the FAP; and
means for controlling, at the EP, wireless network access by the MS via the FAP, in response to the MS access authorization data.

22. The communications apparatus of claim 21, wherein the EP comprises a Femto Gateway (FGW).

23. The communications apparatus of claim 21, wherein the remote storage point comprises an Authorization, Authentication and Accounting (AAA) server.

24. The communications apparatus of claim 21, further comprising means for generating a request for the MS access authorization data using secret information shared with the storage point, the request comprising an identifier for the FAP and the FAP authentication data.

25. The communications apparatus of claim 21, further comprising means for controlling access to a wireless communication network (WCN) via the FAP in accordance with an access control list included in the MS access authorization data, the access control list comprising identifiers for mobile stations authorized to access the FAP.

26. A non-transitory computer readable medium storing computer executable instructions that, when executed by at least one processor, implement components comprising:
a first set of codes for transmitting femto access point (FAP) authentication data from a FAP to obtain MS access authorization data stored by a remote storage point in communication with the FAP;
a second set of codes for receiving the MS access authorization data for the FAP from the storage point at an enforcement point (EP), in response to the FAP authentication data, wherein the EP excludes the FAP; and
a third set of codes for controlling, at the EP, wireless network access by the MS via the FAP, in response to the MS access authorization data.

27. The non-transitory computer readable medium of claim 26, wherein the EP comprises a Femto Gateway (FGW).

28. The non-transitory computer readable medium of claim 26, wherein the remote storage point comprises an Authorization, Authentication and Accounting (AAA) server.

29. The non-transitory computer readable medium of claim 26, further comprising a fourth set of codes for generating a request for the MS access authorization data using secret information shared with the storage point, the request comprising an identifier for the FAP and the FAP authentication data.

30. The non-transitory computer readable medium of claim 26, further comprising a fifth set of codes for controlling access to a wireless communication network (WCN) via the FAP in accordance with an access control list included in the MS access authorization data, the access control list comprising identifiers for mobile stations authorized to access the FAP.

* * * * *